(12) United States Patent
Gold

(10) Patent No.: US 11,531,718 B2
(45) Date of Patent: Dec. 20, 2022

(54) VISUALIZATION OF ENTITY PROFILES

(71) Applicant: Ultra Information Solutions, Herzliya (IL)

(72) Inventor: Ben Gold, Tel Aviv (IL)

(73) Assignee: Ultra Information Solutions, Herzliya (IL)

( * ) Notice: Subject to any disclaimer, the term of this patent is extended or adjusted under 35 U.S.C. 154(b) by 0 days.

(21) Appl. No.: 17/313,852

(22) Filed: May 6, 2021

(65) Prior Publication Data
US 2022/0291804 A1 Sep. 15, 2022

Related U.S. Application Data

(60) Provisional application No. 63/159,951, filed on Mar. 11, 2021.

(51) Int. Cl.
| | |
|---|---|
| *G06F 16/9535* | (2019.01) |
| *G06F 16/9035* | (2019.01) |
| *G06F 16/23* | (2019.01) |
| *G06F 16/245* | (2019.01) |
| *G06F 16/9536* | (2019.01) |
| *G06F 16/9538* | (2019.01) |
| *G06F 3/04817* | (2022.01) |
| *G06F 3/04842* | (2022.01) |
| *G06F 3/04847* | (2022.01) |
| *G06F 16/29* | (2019.01) |
| *G06F 3/04815* | (2022.01) |

(Continued)

(52) U.S. Cl.
CPC ...... *G06F 16/9535* (2019.01); *G06F 3/04815* (2013.01); *G06F 3/04817* (2013.01); *G06F 3/04842* (2013.01); *G06F 3/04845* (2013.01); *G06F 3/04847* (2013.01); *G06F 16/2379* (2019.01); *G06F 16/245* (2019.01); *G06F 16/29* (2019.01); *G06F 16/9035* (2019.01); *G06F 16/9536* (2019.01); *G06F 16/9538* (2019.01); *G06F 3/0482* (2013.01); *G06F 3/0484* (2013.01)

(58) Field of Classification Search
None
See application file for complete search history.

(56) References Cited

U.S. PATENT DOCUMENTS

| 11,106,706 B1 * | 8/2021 | Bates ................. G06F 3/0485 |
|---|---|---|
| 2006/0200382 A1 * | 9/2006 | Arutunian .......... G06Q 30/0261 |
| | | 705/14.58 |

(Continued)

*Primary Examiner* — Mandrita Brahmachari
(74) *Attorney, Agent, or Firm* — Nixon Peabody LLP

(57) ABSTRACT

A system for displaying information on a selected entity is configured to: (a) display, on a graphical user interface (GUI), a menu including an option for probing a world view, a regional view, regional interactions, and a target entity view, wherein the world view includes image icons displayed on a world map, the regional view includes image profiles displayed by region, the regional interactions include image icons representing commonalities between two or more different regions, and the target entity view includes an image of the selected entity; (b) display the world view based on the option being the probing of the world view; and (c) display a set of keywords associated with the image icons based at least in part on calculated ratings associated with the set of keywords, wherein an order of the displayed set of keywords is determined based on the associated ratings.

19 Claims, 14 Drawing Sheets

(51) Int. Cl.
  *G06F 3/04845* (2022.01)
  *G06F 3/0482* (2013.01)
  *G06F 3/0484* (2022.01)

(56) References Cited

U.S. PATENT DOCUMENTS

| | | | | |
|---|---|---|---|---|
| 2006/0271280 | A1* | 11/2006 | O'Clair | G06F 16/9537 |
| | | | | 707/E17.11 |
| 2007/0106780 | A1* | 5/2007 | Farnham | H04L 67/22 |
| | | | | 709/223 |
| 2007/0143281 | A1* | 6/2007 | Smirin | G06Q 30/02 |
| | | | | 707/999.005 |
| 2008/0269921 | A1* | 10/2008 | Banerji | G06Q 10/06 |
| | | | | 700/49 |
| 2009/0216438 | A1* | 8/2009 | Shafer | G01C 21/206 |
| | | | | 701/414 |
| 2011/0173572 | A1* | 7/2011 | van Zwol | G06F 16/5866 |
| | | | | 345/661 |
| 2013/0166329 | A1* | 6/2013 | Arnoux-Prost | G06Q 10/02 |
| | | | | 705/5 |
| 2013/0254276 | A1* | 9/2013 | Ajayi | G06Q 50/01 |
| | | | | 709/204 |
| 2013/0304818 | A1* | 11/2013 | Brumleve | G06Q 30/02 |
| | | | | 709/204 |
| 2014/0180571 | A1* | 6/2014 | Kimchi | G06F 16/29 |
| | | | | 701/409 |
| 2015/0074091 | A1* | 3/2015 | Walkin | G06F 3/0482 |
| | | | | 707/722 |
| 2018/0227373 | A1* | 8/2018 | Rowlett Leslie | H04L 67/18 |
| 2019/0213200 | A1* | 7/2019 | Richards | G06F 21/6254 |

* cited by examiner

VISUALIZATION OF ENTITY PROFILES

CROSS-REFERENCE TO RELATED APPLICATIONS

This application claims the benefit of and priority to U.S. Provisional Application No. 63/159,951, filed Mar. 11, 2021, which is hereby incorporated by reference herein in its entirety.

TECHNICAL FIELD

The present disclosure relates to performing directed online searches and more specifically to systems and methods for automated searching to obtain attributes associated with a target entity.

BACKGROUND

Search engines are ubiquitous in society and have become a standard tool for finding information on local machines, on local networks, and on the internet. Search engines can operate on string searches or image searches. For example, search engines can take in a string input (e.g., a word or phrase) and can provide a page of indexed results. The results are returned from an index and ranked by an order, typically requiring a user to look through the results in order to distinguish applicable results from inapplicable results. For a local search engine that returns files as results, the search can be performed incrementally, where results are provided as they become available. That way, the user can stop the search if the user encounters the intended result. For a web search engine, the results are displayed in bunches, typically organized by page. If the user does not encounter an intended result in a first page, the user has to either modify the search string or browse to a second page of results. Search engines can be embedded in applications (e.g., mobile applications) for searching for information within the applications themselves or for searching databases connected to the applications.

Search engines, as described, rely heavily on user intervention. The user is relied upon to distinguish between relevant and irrelevant results. The user is relied upon to adjust search strings or phrases. The user is relied upon to perform follow-up searches based on partial information. Search engines may use simple fuzzy matching algorithms to correct misspellings, but the search engines have no context or meaning behind the string searches. The present disclosure provides systems and methods that improve search engines to perform automated searches with context.

SUMMARY

According to an aspect of the present disclosure, a system for performing recursive online searches is provided. The system includes a processor and a non-transitory computer readable medium storing instructions such that when the instructions are executed by the processor. The system is configured to: receive a first attribute for building a summary profile for an entity, the first attribute being used as seed data in building the summary profile; search at least one of a set of data sources using the seed data to obtain one or more subsequent attributes related to the seed data, the subsequent attributes being contextual information having a relational connection to the entity; populate the summary profile with the first attribute and the subsequent attributes under specified fields in the profile; determine that a set of attributes in the subsequent attributes does not result in a stopping condition; search the set of data sources using each of the set of attributes to receive additional attributes; and populate the summary profile with the received additional attributes.

The seed data can include a phone number associated with the entity, a name associated with the entity, a photograph associated with the entity, a logo associated with the entity, an email address associated with the entity, a screen name associated with the entity, a related entity associated with the entity, or a location associated with the entity, a group affiliation associated with the entity. The entity can be an organization or a person. The set of data sources can include social media platforms, news media, blogs, or any combination thereof.

The system can be further configured to use at least one of (a) an application programming interface (API), (b) a browser agent, or (c) a firmware, to perform the steps of searching the at least one of the set of data sources using the seed data and searching the set of data sources using each of the set of attributes.

A relational structure for the first attribute, the subsequent attributes, and the additional attributes can form a tree structure. The stopping condition can be based on a depth of the tree, a type of information provided by a respective attribute in the subsequent attributes, or any combination thereof.

According to another aspect of the present disclosure, a method for performing a non-indexed, non-linear dynamic discovery search over the Internet from an initial attribute of a target of interest is disclosed. The method includes: (a) receiving the initial attribute for building a summary profile for the target of interest, the target of interest being an entity, the initial attribute representing a single item of information associated with the entity; (b) setting the initial attribute as a seed attribute for recursive searching; (c) searching over the Internet data records of at least one of a set of data sources for the seed attribute to obtain one or more sub-level attributes related to the seed attribute, the sub-level attributes being contextual information having a relational connection to the target of interest, the data records not representing a search index; (d) populating the summary profile for the target of interest with the seed attribute and the sub-level attributes under specified fields in the summary profile; (e) determining that a set of attributes in the sub-level attributes does not result in a stopping condition; (f) repeating steps (c), (d), and (e) for each one of the set of attributes by setting each one of the set of attributes as the seed data.

A relational structure for the initial attribute and the sub-level attributes can form a tree structure. The stopping condition can be based on a depth of the tree, a type of information provided by a respective attribute in the sub-level attributes, or any combination thereof.

According to a still another aspect of the present disclosure, a system for populating missing information based on second hand information is provided. The system includes a processor and a non-transitory computer readable medium storing instructions such that when the instructions are executed by the processor. The system is configured to: determine that a summary profile of a target entity includes at least one unpopulated field; search at least one of a set of data sources to obtain one or more attributes for populating the at least one unpopulated field, the one or more attributes being information extracted from peripheral entities associated with the target entity; calculate, for each of the one or more attributes, a respective confidence score based at least in part on a set of factors, the set of factors including an activity level of the target entity; based on a respective confidence score being above a threshold, populate a respective unpopulated field with a respective one of the one or more attributes.

The set of factors can further include an active status of the target entity on a social media platform, a deleted status of a post related to the target entity, a duration of a relationship between the peripheral entities and the target entity, a type of relationship between the peripheral entities and the target entity, a duration of the relationship between the peripheral entities and the target entity. The one or more attributes can include a group associated with the target entity, a topic associated with the target entity, a geographic location associated with the target entity, or any combination thereof.

According to yet another aspect of the present disclosure, a system for displaying relationships between entities is disclosed. The system includes a processor and a non-transitory computer readable medium storing instructions such that when the instructions are executed by the processor. The system is configured to: display an image of a target entity on a graphical user interface (GUI); display an image of a peripheral entity on the GUI; display a set of icons indicating at least one of a nature of a connection between the peripheral entity and the target entity, the nature of the connection including a mutual entity related to both the target entity and the peripheral entity; and display a set of keywords indicating the nature of the connection.

The mutual entity can include an organization, a web page, a social group, an email address, or any combination thereof. The nature of the connection can further include a date relating the target entity and the peripheral entity, an activity relating the target entity and the mutual entity, a duration of the activity relating the target entity and the mutual entity. The set of keywords can further indicate a source for the determined connection between the peripheral entity and the target entity. The source can include declared locations.

According to a still further aspect of the present disclosure, a system for displaying information on a selected entity is provided. The system includes a processor and a non-transitory computer readable medium storing instructions such that when the instructions are executed by the processor, the system is configured to: display, on a graphical user interface (GUI), a menu including an option for probing a world view, a regional view, regional interactions, and a target entity view. The world view includes image icons displayed on a world map, the regional view includes image profiles displayed by region, the regional interactions include image icons representing commonalities between two or more different regions, and the target entity view includes an image of the selected entity. The system is further configured to display, on the GUI, the world view based on the option being the probing of the world view; and display, on the GUI, a set of keywords associated with the image icons.

The system can be further configured to display, on the GUI, the regional view based on the option being the probing of the regional view. At least two regions can be visible in the regional view such that selecting one of the at least two regions expands the selected one of the regions and hides the unselected regions. A rating can be included in each of the displayed image profiles in the regional view.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

Figure 1:
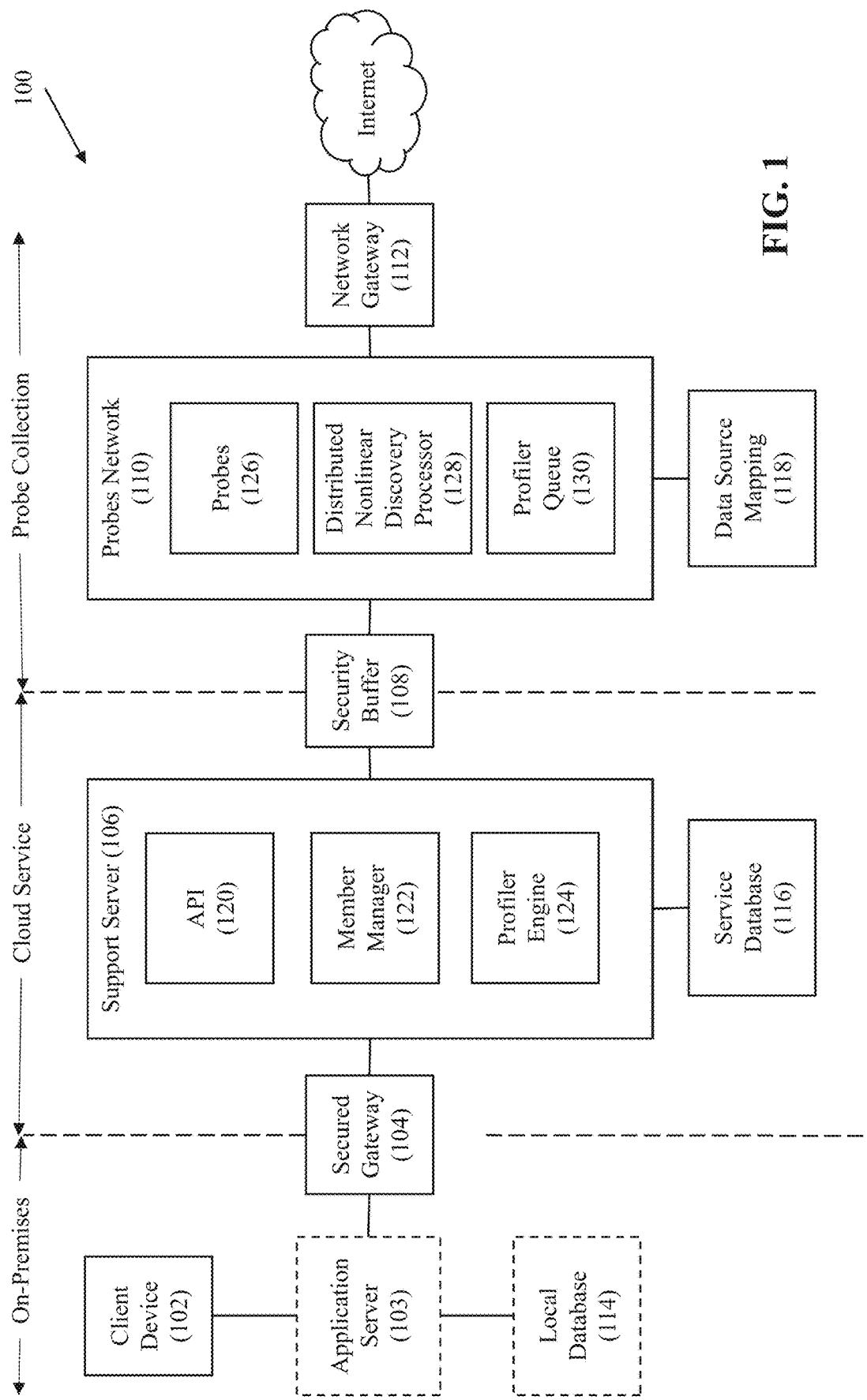
FIG. 1 illustrates a block diagram of a system for performing an automated search, according to some implementations of the present disclosure.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

As discussed above, search engines require manual intervention and do not take into account meanings and contextual information surrounding a search string. Results are conventionally returned from an index to improve the search speed. Embodiments of the present disclosure provide systems and methods for performing recursive indexless searches, taking into account relational information to improve search results. Embodiments of the present disclosure use contextual information to enhance search results without referring to an index. Embodiments of the present disclosure can present search results in a profile without user intervention to discern between relevant results and irrelevant results.

FIG. 1 illustrates a block diagram of a system 100 for performing an automated search, according to some implementations of the present disclosure. The automated search can be a recursive search that generates a tree structure. The tree structure can be stored in order to provide a search history. The automated search is carried out by a discovery engine that uses a non-indexed, distributed, non-linear processing, dynamic discovery expansion strategy starting from a single initial seed attribute of a target of interest as a search input term to the discovery engine to determine associations with the seed from multiple data sources having disparate data types and different access procedures to retrieve data from the data source. Unlike conventional search engines, the discovery engine disclosed herein does not rely on search through search indexes (rather, the actual data records in the data stores or sources are searched), and probes multiple data sources having different data types and different procedures for accessing or retrieving data from the data source. The automated expansion is done in real-time, completed in a matter of seconds, while the number of branches of the search tree structure grow non-linearly, to extract attributes associated with the seed from the disparate data sources. A profile is created for the initial seed attribute and includes attributes associated with the seed attribute extracted from the data sources. Based on the initial seed attribute (e.g., its type, whether it is a phone number, a name of a person or organization, partial or complete, an email address, or the like), multiple data sources are selected to be probed. The initial seed attribute can be a single item of information or a single word. For example, a conventional search input phrase can include multiple words that form a phrase or a question, which would not correspond to an initial seed attribute that term is as used herein. Unlike conventional search engines, the discovery engine of the present disclosure requires only a single item of information to be inputted as the initial search query. A single item of information is one and only one piece of information about or associated with a target of interest or an entity. A person's full or partial name, an email address, a phone number, a full or partial address, a photograph—each of these is a single item of information, even though a person's name or address may include multiple words—they represent one piece of information about the entity (which in this case is a person). This is contrasted with a phrase such as "John Doe home address" because it contains at least two items of information in the search query—the person's name, John Doe, and home address. Importantly, the discovery engine of the present disclosure does not search through conventional search indices or indexes, without sacrificing speed that indexes typically offer over conventional "brute force" searches. Another important aspect of the discovery engine disclosed herein is that disparate data sources having any combination of different data structures, data organization, query languages, data types, data owners or data store operators, and the like. As explained below, examples of different data sources include a data source hosted by a social media operator over the Internet, and a data source hosted by an online map operator over the Internet. The data types stored in these data stores are also different as will be understood by skilled persons the types of data required to organize and parse publicly available social media information are different from the types of data required to organize and parse publicly available mapping information. A technical challenge solved by the discovery engine is parsing multiple data sources having different data types without using search indexes and without sacrificing search speed. Data records in the probed data stores can be disparate as well, e.g., can be in the form of documents, images, scripts, and the like. Searches using the present discovery engine can be completed in minutes using multiple probes operating in parallel, despite iterating through potentially hundreds of data sources storing different data types without relying on search indices or indexes. A probe refers to a search (e.g., formulated as a search query in a database structured query language) inputted to a data source or data store to request outputs corresponding to information or data stored within the data source or data store corresponding or having a relevance or logical connection to or with the inputted query.

Search speed is improved in that each selected data source is probed in parallel using one of multiple probe types to extract one or more attributes associated with the seed attribute. The extracted attribute is used as the next seed for the next set of data sources to be probed using the same logic and strategy applied by the initial seed attribute. As attributes are extracted with confidence from the data sources, the profile is updated with the extracted attributes to augment and enhance information about the target of interest. In some cases, only the initial seed attribute may be known by the searcher, so the automated discovery engine builds a profile automatically starting with the initial seed attribute to find other attributes associated with the target of interest (e.g., a person or an organization) that can be added to the profile with a reasonable degree of certainty that the attribute is associated with the target of interest. For example, the initial seed may only be a mobile number of a person of interest, but the discovery engine can locate other attributes about that person, such as, for example, that person's address, family members, membership in organizations, full name, date of birth, and the like. The output of the discovery engine is a profile about the target of interest that includes the initial seed attribute (which may be modified or updated based on the discovery results, such as a partial name can be updated to include a full name of a person) and other attributes extracted from the disparate data sources having different data source access requirements.

Because some data sources that are probed by the discovery engine of the present disclosure are not indexable, conventional search engine indexing cannot be leveraged to improve the speed, accuracy, and completeness of the data sources to be interrogated based on the search string input. As a result, conventional search engines that consult indexes will ignore or bypass "closed" data sources having specific access requirements whose contents are not indexable. Moreover, the discovery engine according to the present disclosure probes publicly accessible data sources only (e.g., accessible over the Internet), and does not need to employ any strategies for probing proprietary and closed systems. Compared to conventional search engines, the discovery engine of the present disclosure offers the possibility to extract a richer and more diverse set of attributes from sources that are difficult to probe yet can yield highly reliable attributes about a target of interest that are not necessarily discernible through indexed data sources, and at a speed that completes the entire discovery process in a matter of minutes. To prevent uncontrolled runaway expansion of the search scope, the discovery engine of the present disclosure leverages one or more stopping criteria to terminate further expansion along a branch of the tree structure spawned from the initial seed attribute and to avoid redundant interrogation of data sources along different branches once an attribute has been extracted with a high degree of confidence as having a highly probable or likely association with the initial seed attribute.

To simplify discussion, the singular form will be used for components identified in FIG. 1 when appropriate, but the use of the singular does not limit the discussion to only one of each such component. The system 100 includes a client device 102, a secured gateway 104, a support server 106, a security buffer 108, a probes network 110, a network gateway 112, a service database 116, and a data source mapping database 118. In some implementations, the system 100 further includes an application server 103 and a local database 114. Each of these components can be realized by one or more computer devices and/or networked computer devices. The one or more computer devices include at least one processor with at least one non-transitory computer readable medium.

The client device 102 is a computing device associated with an end user. The client device 102 includes servers, laptops, desktops, workstations, smartphones, tablets, etc. The client device 102 can have network access to obtain search results. The client device 102 can use the network access to retrieve data from the local database 114 or to communicate with the application server 103.

The application server 103 is a computing device that provides access to the local database 114. The application server 103 can compile search results and profiles for local storage. Local storage includes information stored at a same location where the user of the client device 102 is present. For example, the location can be a location of a business, a governmental agency, etc. The application server 103, the client device 102, and the local database 114 are on the same network at the location. The network is denoted as "on-premises" in FIG. 1. The application server 103 can include search settings configured by the client device 102. The application server 103 can include topics watched by the client device 102. The application server 103 can provide alerts and reports to the client device 102 regarding search results.

In some implementations, the search results are related to an entity of interest or a target entity. The application server 103 can store the search results in a profile for the entity of interest or target entity. The profile includes information associated with or concerning the target entity. For example, the profile can include a name of the target entity, a phone number associated with the target entity, one or more locations associated with the target entity, links to social media profiles associated with the target entity, names of groups associated with the target entity, etc. The application server 103 can support software or application that manages storage in the local database 114. An entity of interest or a target entity can be a human person or an organization or enterprise.

The support server 106 directs searches based on parameters or attributes received from the client device 102. The client device 102 can provide search parameters to the support server 106 via the secured gateway 104. The secured gateway 104 enables communication between the "on-premises" network where the client device 102 resides and the "cloud service" network where the support server 106 resides. The secured gateway 104 can be a router, a computer, or in some implementations, the secured gateway 104 can be included in the application server 103. The secured gateway 104 can have an integrated firewall, proxy server, or both. The support server 106 returns discovered details or search results back to the client device 102 via the secured gateway 104. The support server 106 also provides access control.

The support server 106 includes an application programming interface (API) 120, a member manager 122, and a profiler engine 124. The API 120 facilitates information transfer between the client device 102 and/or the application server 103 and the support server 106. The member manager 122 facilitates access control, allowing the support server 106 to authenticate users or members. Members or users can have quota limits. For example, members can have a maximum number of searches or queries that can be performed in parallel. Members can have a maximum network transfer rate of information. That is, the network traffic between the support server 106 and the client device 102 and/or the application server 103 can be throttled based on a status of the member or user.

The support server 106 includes a profiler engine 124. The profiler engine 124 receives search parameters or search strings and prioritizes searches for different members. The profiler engine 124 implements network traffic throttling and other limitations on searching based on settings obtained from the member manager 122. The service database 116 stores data, settings, and parameters relied on by the profiler engine 124, the API 120, and the member manager 122. For example, the service database 116 can store membership information, throttling information, etc.

The security buffer 108 is a network gateway that connects the network of the support server 106 (i.e., the "cloud service" network) to the network of the probes network 110 (i.e., the "probe collection" network). The security buffer 108 includes similar functionality as the secured gateway 104. The security buffer 108 can include storage in order to amount of information flowing between the "cloud service" network and the "probe collection" network. In some implementations, the "probe collection" network is at a same location as the "on-premises" network. That is, the "probe collection" network can be a private network set up at a location of a business, government organization, etc.

The probes network 110 includes one or more computing devices. The probes network 110 includes one or more probes (126), a distributed non-linear discovery processor 128, and a profiler queue 130. The probes network 110 receives discovery or search requests from the support server 106 and determines a search strategy using the data source mapping database 118 to search for information obtainable via the internet. The network gateway 112 separates the "probe collection" network from the internet. The network gateway 112 can include a firewall, and a virtual private network server and/or proxy server.

The profiler queue 130 of the probes network 110 manages discovery or search requests obtained from the support server 106. The profiler queue 130 maintains a buffer such that requests can be prioritized. In some implementations, the prioritization is based on a first-in-first-out. In some implementations, the prioritization is based on a status associated with the member that requested the search. For example, members can be stratified into categories or tiers, where requests from members at a higher tier are prioritized over members of a lower tier.

The probes 126 of the probes network 110 can include an application programming interface or a browser agent on one or more computing devices. The probes 126 can include a custom firmware on one or more computing devices. The probes 126 can establish connection to different types of online communication media, including for example, social media networks, web pages, file repositories, etc. The probes 126 can emulate or automate human-like behavior. For example, the probes 126 can provide signals or indication of clicking, scrolling, reading, typing, etc. In the context of a social media network, the probes 126 do not merely download data from the social media network in a manner that implies a data dump. The probes 126 can emulate humanlike behavior, keeping track of throttling limits and making sure not to exceed network traffic limits that betray the probes 126 as being non-human. The probes 126 can perform clicks and/or sit on pages for a time interval. The time interval can be randomized within a range (e.g., between 30 seconds and 2 minutes, between one minute and six minutes, etc.).

The data source mapping database 118 provides a predefined database for where different information can be found. For example, phone numbers are more likely obtainable in social media profiles. Thus, if a search for a phone number of an entity is desired, then the data source mapping database 118 can include different social media companies' websites to try and ascertain the information. Addresses can be readily obtainable on websites. For example, if the entity is an organization, then the data source mapping database 118 can include using a standard search engine to query the name of the organization in order to obtain the organization's "about" or "contact" page.

Figure 2:
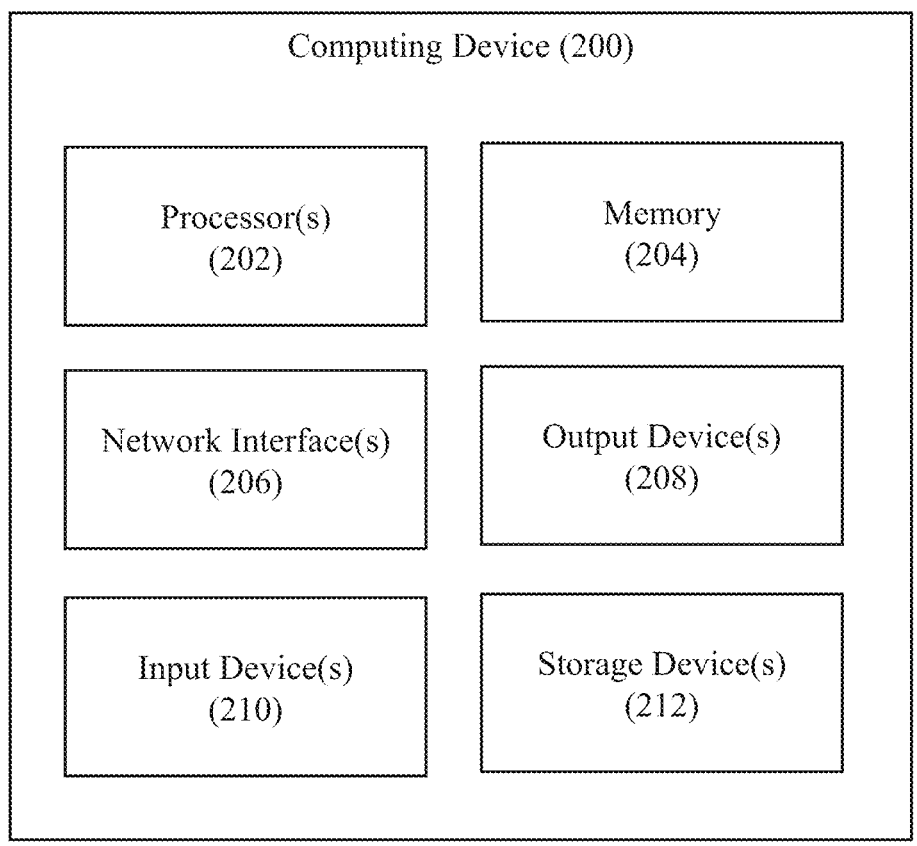
FIG. 2 illustrates a block diagram of a computing device, according to some implementations of the present disclosure.

FIG. 2 illustrates a block diagram of a computing device 200, according to some implementations of the present disclosure. The computing device 200 is illustrated as one such device, but based on implementation, multiple such devices can be networked or formed in a cluster to implement one or more components illustrated in FIG. 1. The computing device 200 can be used in realizing any one of the client device 102, the application server 103, the secured gateway 104, the support server 106, the security buffer 108, the probes network 110, the network gateway 112, the local database 114, the service database 116, and the data source mapping 118. The computing device 200 may include one or more processors 202, memory 204, network interfaces 206, output devices 208, input devices 210, and storage devices 212. Although not explicitly shown in FIG. 2, each component provided is interconnected physically, communicatively, and/or operatively for inter-component communications in order to realize functionality of the different components of FIG. 1. To simplify the discussion, the singular form will be used for all components identified in FIG. 2 when appropriate, but the use of the singular does not limit the discussion to only one of each component. For example, multiple processors may implement functionality attributed to the processor 202.

The processor 202 is configured to implement functions and/or process instructions for execution within computing device 200. For example, the processor 202 executes instructions stored in the memory 204 or instructions stored on the storage device 212. In some implementations, instructions stored on the storage device 212 are transferred to the memory 204 for execution at the processor 202. The memory 204, which may be a non-transient, computer-readable storage medium, is configured to store information within the computing device 200 during operation. In some implementations, the memory 204 includes a temporary memory that does not retain information stored when the computing device 200 is turned off. Examples of such temporary memory include volatile memories such as random access memories (RAM), dynamic random access memories (DRAM), and static random access memories (SRAM). The memory 204 also maintains program instructions for execution by the processor 202 and serves as a conduit for other storage devices (internal or external) coupled to the computing device 200 to gain access to the processor 202.

The storage device 212 includes one or more non-transitory computer-readable storage media. The storage device 212 is provided to store larger amounts of information than the memory 204, and in some instances, configured for long-term storage of information. In some implementations, the storage device 212 includes non-volatile storage elements. Non-limiting examples of non-volatile storage elements include flash memories, magnetic hard discs, optical discs, solid state drives, resistive or forms of electrically programmable memories (EPROM) or electrically erasable and programmable (EEPROM) memories.

The network interfaces 206 are used to communicate with external devices and/or servers. The computing device 200 may include multiple network interfaces 206 to facilitate communication via multiple types of networks. The network interfaces 206 may include network interface cards, such as Ethernet cards, optical transceivers, radio frequency transceivers, or any other type of device that can send and receive information. Non-limiting examples of the network interfaces 206 include radios compatible with several Wi-Fi standards, 3G, 4G, Long-Term Evolution (LTE), 5G, Bluetooth®, Bluetooth Low Energy, etc.

The computing device 200 may also be equipped with the one or more output devices 208. The output device 208 is configured to provide output to a user using tactile, audio, and/or video information. Examples of the output device 208 include a display screen (a liquid crystal display (LCD) display, LCD/light emitting diode (LED) display, organic LED display, etc.), a sound card, a video graphics adapter card, speakers, magnetics, or any other type of device that may generate an output intelligible to a user.

The computing device 200 is equipped with the one or more input devices 210. The input devices 210 are configured to receive input from a user or the environment where the computing device 200 resides. In certain instances, the input devices 210 include devices that provide interaction with the environment through tactile, audio, and/or video feedback. These may include a presence-sensitive screen or a touch-sensitive screen, a mouse, a keyboard, a video camera, microphone, a voice responsive system, or any other type of input device.

Figure 3:
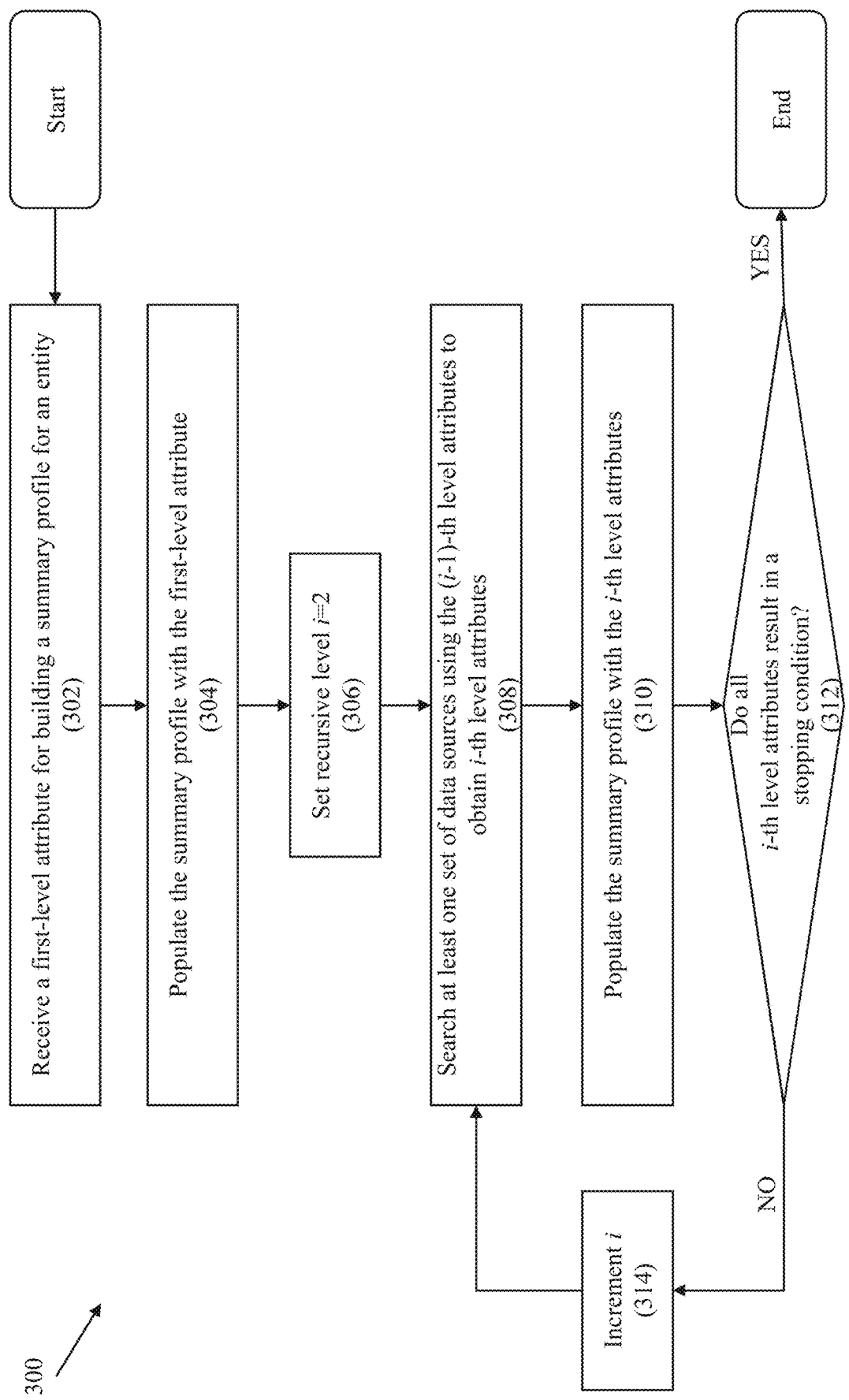
FIG. 3 is a flow diagram showing steps for performing recursive online searches, according to some implementations of the present disclosure.

FIG. 3 is a flow diagram of a process 300 for performing recursive online searches using the system 100, according to some implementations of the present disclosure. At step 302, a first-level attribute is received for building a summary profile for an entity. The first-level attribute is a seed attribute, an initial seed attribute, or seed data. The first-level attribute is called a seed attribute because all other attributes or information obtained will stem from the first-level attribute. The seed attribute can include a single item of information as opposed to a phrase, such as a phone number associated with the entity, a name associated with the entity, a photograph associated with the entity, a logo associated with the entity, an email address associated with the entity, a screen name associated with the entity, a related entity associated with the entity, a location associated with the entity, or a group affiliation associated with the entity. The entity can be an organization or a person. The seed attribute is distinguished from traditional search queries that can include phrases, questions, or words with logical operations and can pertain to questions unrelated to an organization or a person. The seed attribute according to the present disclosure is a single item of information about a person or organization of interest. In the law enforcement arena, for example, sometimes the officer has only a single item of information about a target or suspect of interest, such as a phone number, a partial name, or a photograph. The input to the discovery engine herein is this initial seed attribute containing a single item of information about a person or organization of interest. Depending on the type of the seed attribute, e.g., whether it is a phone number or a person's name, different types of data sources and different types of probes are employed to extract information about the seed attribute from the corresponding data sources. The logic and strategy employed for the extraction is the same regardless of how deep into the search the discovery engine is, which allows streamlines the discovery using probes into disparate data sources. The output from the preceding probe is used as a seed to the next set of probes, and the same logic and extraction strategies are employed for the subsequent data sources to be probed.

The first-level attribute or the seed attribute can be relayed from the client device 102 to the support server 106. Based on the member using the client device 102, the profiler engine 124 of the support server 106 receives the first-level attribute and develops search settings for the first-level attribute. For example, the member may be part of a certain tier, hence a throttling of network traffic or prioritization of search can be set.

At step 304, the summary profile is populated with the first-level attribute. In some implementations, the application server 103 relays the first-level attribute to the support server 106. The application server 103 can create the summary profile for the first-level attribute and can insert a value in the summary profile for that attribute. For example, if the first-level attribute is a phone number, then the application server 103 creates the summary profile with a key "phone number" and the value corresponding to the key is the phone number received from the client device 102. In some implementations, the summary profile is a default profile where several keys are created, and corresponding values for the several keys are left blank. For example, creating the summary profile will create the following keys: "name", "image", "online profile", "description", "email address", "phone number", etc. Based on the received first-level attribute from step 302, the appropriate key is populated with a value. In the example where the key is "phone number", then the value for key "phone number" is populated with the first-level attribute (i.e., the seed data).

In some implementations, the created summary profile can be stored in the local database 114 for easy retrieval by the client device 102. In some implementations, the created summary profile is stored in the service database 116. In some implementations the created summary profile is stored locally on the client device 102 or on the service database 116. Metadata can accompany the created summary profile. For example, a date/time can be associated with when keys are populated, a date/time can be associated with when the summary profile was created, one or more data source(s) where the value was discovered can be identified. If a seed data, then the member who provided the seed data can be identified. In some implementations, a confidence score associated with one or more values can be stored.

At step 306, the recursive level i is set to 2. This step is merely used to keep track of search depth. That is, a search performed with seed data can spawn other searches, therefore, the subsequent searches can be organized in a tree structure. Each level of the tree can be referred to as the recursive level i.

At step 308, at least one set of data sources is searched using the (i−1)-th level attributes to obtain i-th level attributes. For example, the first level attribute (i.e., the seed data) is used to search the set of data sources to obtain second level attributes. The second level attributes are related to the seed data. The second level attributes include values that can be used to populate one or more keys in the summary profile. The second level attributes provide contextual information that forms a better picture of qualities or properties associated with the target entity. For example, if the seed data includes a phone number, second level attributes returned can be one or more names associated with the phone number, one or more webpages or websites associated with the phone number, online profiles associated with the phone number, etc.

The set of data sources can include social media platforms or websites, news media, blogs, web site registration data via a WHOIS query, marketplace platforms, and/or institutional, governmental, or any other accessible webpage. The set of data sources can be chosen for the seed data. For example, as discussed above, if the seed data is a phone number, then potential data sources for finding information on the phone number includes online phone directories or social media platforms. News media websites or platforms may not be the first go-to data source for a phone number. Additionally, a confidence score associated with information on a phone number found in an online phone directory will be higher than information found on, e.g., a news web site. Accessing or extracting data from the set of data sources is different. Important to the present disclosure is that for each attribute used by the probe(s) to query each data source, different types of data sources having different access criteria are probed for each attribute depending on the attribute type. For example, data stored in some data sources are protected by a user name and password, others may require a human to click on a control button to gain access to the data source, other data sources have no restrictions to access, and the like.

The probe network 110 performs the search at step 308. The data source mapping database 118 can provide appropriate data sources for searching a specific value provided as seed data. The probes 126 can interact with the data sources via the network gateway 112. The probes 126 can include a web browser agent. The web browser agent can search for the seed data by opening up specific websites provided by the data source mapping database 118. The probes 126 can include an application programming interface whereby the application programming interface is used to directly connect to a data source to retrieve data in one of many formats, e.g., a JavaScript Object Notation (JSON) format. The probes 126 can include a custom firmware with executable code to perform the search on the seed data using data sources identified via the data source mapping database 118. The distributed non-linear discovery processor 128 allows the probe 126 to develop a search strategy automatically according to the results within each of the different search phases.

At step 310, the summary profile is populated with the obtained i-th level attributes. For example, key-value pairs in the summary profile as discussed above in connection with step 304 are appropriately populated. In the example where the phone number is the seed data, if a name is obtained, then the key "name" is populated with the obtained name. Metadata associated with obtaining the name is also stored. The metadata can include a confidence score, a date/time when the value is stored, the data source where the value was discovered, etc.

At step 312, the i-th level attributes are evaluated to determine whether a stopping condition is met. In some implementations, the stopping condition is based on a depth of the search tree. For example, the seed data is only allowed to develop a tree of depth 3, 4, 5, 6, etc. The recursive level i can be compared against the threshold to determine whether or not to stop searching. If the threshold is met, then the process 300 ends. Otherwise, a new search with the obtained attributes is commenced as indicated by the steps 314, 308, and 310. Another stopping condition can be based on when the same attribute is extracted a number of times, such as 2 or 3, from different probed data sources. When this occurs, the process 300 ends and ceases to probe deeper into the tree structure. Another stopping condition can be based on receiving an attribute but having no available sources to handle the specific attribute. For example, an identification number can be included as one of the i-th level attributes. The identification number may be a number from a specific database or a private database not connected to the internet or not accessible by the probes network 110. Since the identification number is not searchable in the appropriate database, the stopping condition is reached.

In some implementations, the stopping condition is based on certainty scores of the i-th level attributes. For example, if four second-level attributes are obtained from the seed data, then a confidence score is determined for each of the four second-level attributes. Any one of the attributes that has a confidence score that is below a threshold is deemed to have reached a stopping condition. If all of the four second-level attributes are deemed to reach a stopping condition based on their respective confidence scores, then the process 300 ends. Otherwise, the second-level attributes that have confidence scores that do not implicate the stopping condition are used in a further search as indicated by the steps 314, 308, and 310.

In some implementations, the stopping condition is based on duplicate values or attributes being obtained. For example, after performing multiple searches and the same values or attributes are obtained as results, the stopping condition is met. For example, if the summary profile includes values for the keys "name", "phone number", "online profile", and "email address", then a search that keeps returning the same values for each of those keys and not any new key will be deemed to have met the stopping condition.

In some implementations, the stopping condition is based on the type of data received. For example, if the value received is very broad, then the stopping condition for that specific value can be implicated. For example, if key "location" was found to have a value "Zambia", then a search for "Zambia" may not be productive because it can implicate a much broader set of information that would include irrelevant information. As such, certain types of data like geographic location can implicate the stopping condition. Any one of the aforementioned methods of implementing stopping conditions can be combined with any others.

If at least one of the i-th level attributes does not implicate the stopping condition, then at step 314, the recursive level i is incremented. Once incremented, the (i−1)-th level attributes are used in a search to obtain i-th level attributes. For example, at step 312, if two out of five second-level attributes do not implicate the stopping condition, then the two second level attributes are used to obtain third-level attributes at step 308. The steps 310 and 312 are then repeated with the third-level attributes. The loop formed by steps 312, 314, 308, 310, and 312 is repeated until all i-th level attributes meet the stopping condition.

In some implementations, for security purposes, the network gateway 112 includes a proxy server and/or a virtual private network to mask addresses of the probes 126. When performing searches, outbound connections of the probes 126 to the internet are allowed while inbound ports or connections are blocked. The outbound connections can be used to request data which allows data to be pulled on demand and not pushed at will from the internet to the probes 126.

Figure 4:
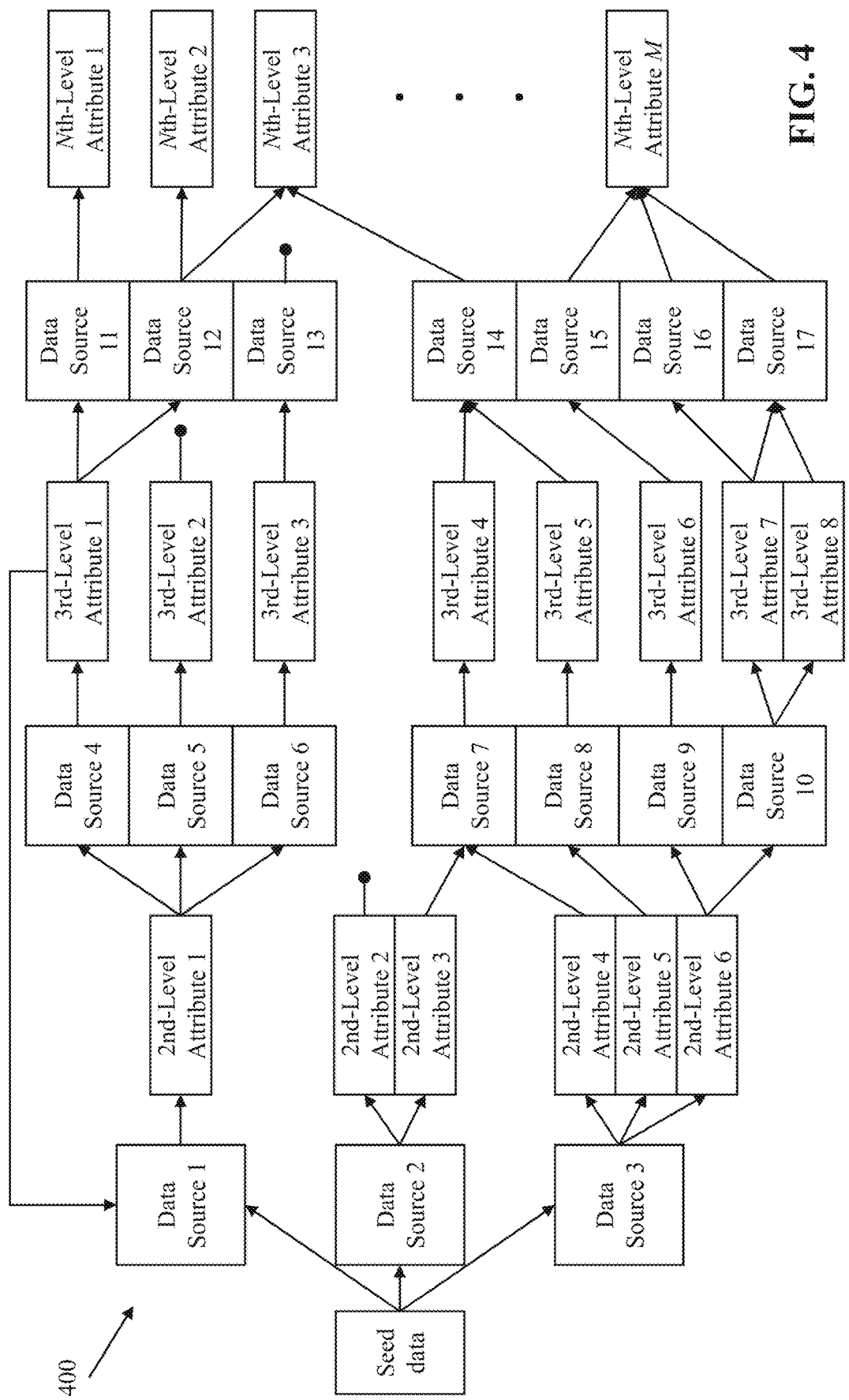
FIG. 4 illustrates a non-linear discovery processing diagram, according to some implementations of the present disclosure.

FIG. 4 illustrates a non-linear discovery processing diagram 400, according to some implementations of the present disclosure. The diagram 400 is an example structure that can be sketched to represent results of the recursive search process 300 of FIG. 3. The diagram 400 assumes that the first-level attribute is the seed data. The seed data is used to search data source 1, data source 2, and data source 3. The search results in second level attribute 1, second-level attribute 2, second-level attribute 3, second-level attribute 4, second-level attribute 5, and second-level attribute 6. The second-level attributes are used to search other data sources (e.g., the data sources 4-10). Although depicted as separate data source, these data sources can be the same as the data sources 1-3. The second-level attribute 2 is shown to have met a stopping condition, hence is not used for further search. Similarly, the third-level attribute 2 is shown to have met a stopping condition and is not used for further search. Sometimes data sources do not return any meaningful results. For example, the data source 13 is shown to not return any attributes. Sometimes one or more data sources can return the same attribute. If the same attribute is returned by more than one data source based on a search using different attributes, then the confidence score for the returned attribute can be increased. If the seed data and the third-level attribute 1 are of the same type (e.g., both are phone numbers), then it can be useful to use the same data source (e.g., the data source 1) for a search on the third-level attribute 1 as indicated in FIG. 4.

As discussed above in connection with step 312 of FIG. 3, geolocation can be a type of data that implicates a stopping condition. In some implementations, breached accounts can be another type of data that implicates a stopping condition. A breached account may implicate a stopping condition because once an account has been breached, information obtained from the account may not be trustworthy. This is similar to having a low confidence on the information which triggers a stopping condition. Breached accounts include breached email accounts, breached financial accounts, etc. The target entity can have more than one phone number, email address, name, related organization, online profile, image or picture, online group, etc., that is discovered using the current search strategy. For example, if the target entity is a person, then the person may have a formal name of "John Frederick Jones" but goes by "Jack Frederick" in social media profiles but goes by "Fred Jones" in social circles.

Figure 5:
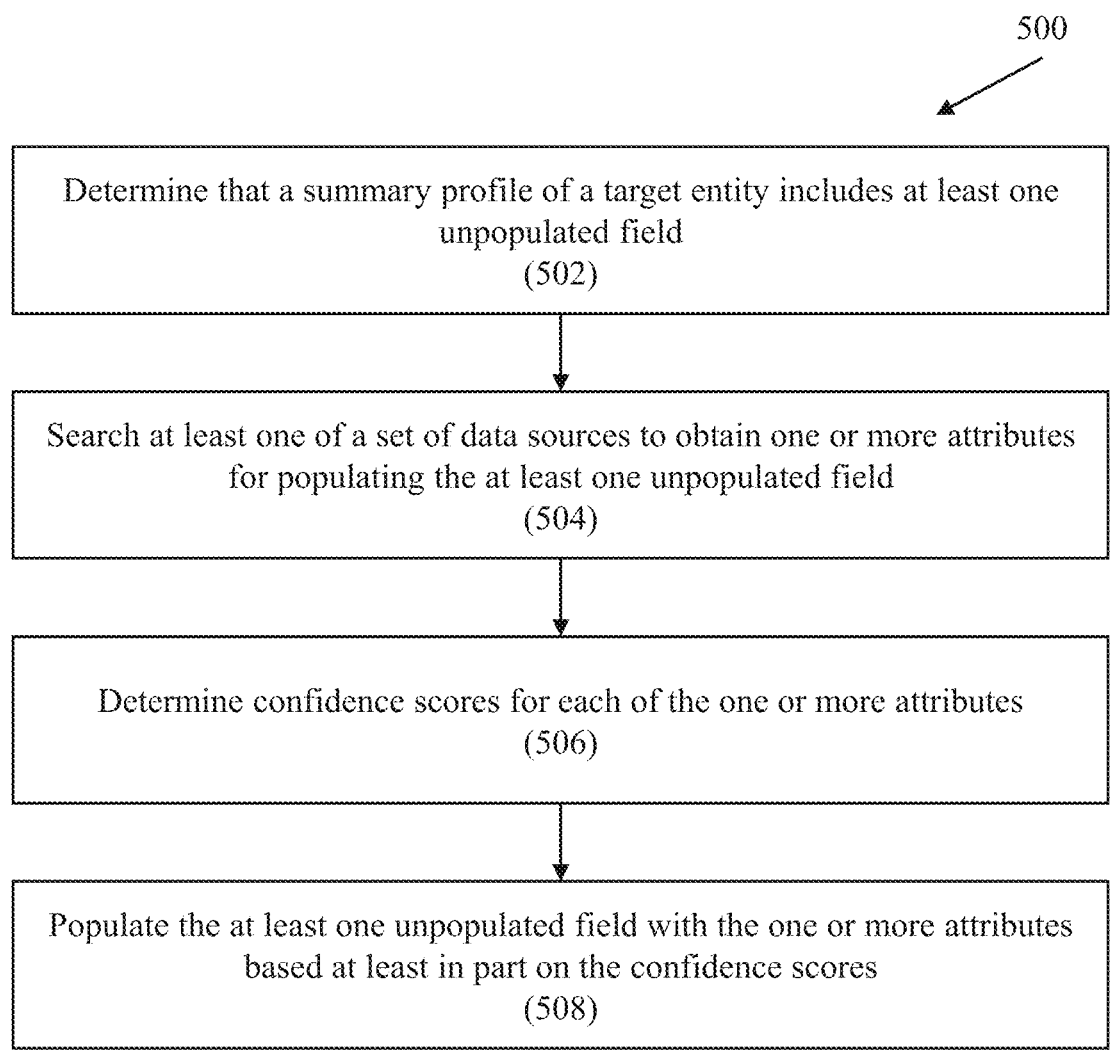
FIG. 5 is a flow diagram showing steps for populating missing information based on second-hand information, according to some implementations of the present disclosure.

In some implementations, once a summary profile is created for a target entity, information for certain keys are not populated. Sometimes, this information can be important, hence a different search strategy can be employed to obtain the important information. FIG. 5 is a flow diagram of a process 500 for populating missing information in a summary profile based on second-hand information from, e.g., electronic data stores that are accessible over the Internet, according to some implementations of the present disclosure. At step 502, the summary profile of the target entity is determined to include at least one unpopulated field. Although described in the context of unpopulated fields, the process 500 can be applied to incomplete information, inaccurate information, protected information, etc. In some implementations, the application server 103 performs analysis on the local database to determine whether confidence scores of certain values in the summary profile of the target entity meet a threshold. The keys with values that have confidence scores that do not meet the threshold are singled out and included as part of the at least one unpopulated field. Essentially, this process or algorithm 500 reliably locates missing information about a target of interest (e.g., person or organization) by scraping and processing information having a meaningful association with the target using information extracted from publicly available data stores. Missing information about the target is automatically populated by the algorithm, and once populated, the user can have a high degree of confidence in the integrity and accuracy of the information supplied by the algorithm 500. To do this manually could take potentially hundreds or even thousands of man-hours and human intelligence effort given the enormous amount of data and data sources to cull through and analysis of a potential association or relevance about a piece of information to the target. To be clear, this approach is not so much about finding the information, but rather about making intelligent decisions using contextual and other clues about an item of information to decide whether it can be reliably added to the target's profile with a high degree of confidence that the information reflects a relevant attribute, characteristic, or association of, with, or relating to the target. This algorithm 500 automatically calculates a score indicating the strength of an association (or relevance) of an item of found information with the target entity to determine whether this information belongs within the target's sphere of associations. This includes probing information that another person or entity posts or describes about the target to determine its reliability, even if the target has never published such information. In this way, the algorithm 500 can mimic or approximate how human intelligence is carried out to profile a person or organization, but does so in a much faster way (within seconds) by leveraging computers and database queries across computer networks. In other words, to assess whether an item of information belongs within the target's sphere of associations, the algorithm 500 can test another piece of information posted or published by another person having an association with the target, because such information may not be posted or published by the target itself (e.g., the target's address or university attended).

At step 504, at least one of a set of data sources is searched to obtain one or more attributes for populating the at least one unpopulated field. The one or more attributes include information extracted from peripheral entities associated with the target entity. For example, the summary profile of the target entity can include friends, groups, associates, etc. If the target entity is a person, then the target entity's social media profile can expose her friends, her interests, the groups she has joined, etc. The peripheral entities would be in this example her friends and the groups she has joined or is affiliated with. The number of entities in the peripheral entities can be narrowed based on frequency of contact between the target entity and the peripheral entity. For example, if a first person and a second person interact through online posts with each other at least once a week, then the second person can be deemed to be within a sphere of association of the first person, for the purpose of obtaining information about the first person from the second person. On the other hand, if the frequency of interaction is less than once a week, then the second person can be deemed to not be as important for obtaining credible information about the first person.

At step 504, a similar search as described in the process 300 is performed on publicly extracted information (e.g., social media check-ins or location data extracted from online posts in in the "About" or similar section of the target's social media or other online profile) from the peripheral entity in hopes of finding information that would link to the target entity. In some implementations, the peripheral entity and the target entity entering into business or personal transactions with common individuals can expose that the target entity is part of a group that includes the common individuals and the peripheral entity. Such insight analysis can be performed to determine group affiliation of the target entity, organizations associated with the target entity, geographic locations associated with the target entity, and/or subjects associated with the target entity.

At step 506, confidence scores are calculated or determined for each of the one or more attributes based at least in part on a set of factors. The set of factors can include an activity level of the target entity (e.g., how long the target entity has been active on a social media platform, and how active by frequency of posts or comments), an active status of the target entity on a social media platform (e.g., whether the target entity has been banned, suspended, blocked, or the like), a deleted status of a post related to the target entity, a duration of a relationship between the peripheral entities and the target entity, a type of relationship between the peripheral entities and the target entity, data sources from which the one or more attributes are obtained, a number of times the one or more attributes are returned as search results from different data sources, or any combination thereof. Higher confidence scores (e.g., between 51-90%) are associated with higher levels of interactions between the target entity and the peripheral entity. A post associated with the target entity that is deleted by the peripheral entity lends more credence to the information in the post, or a suspension or banning of the target entity's account by the peripheral entity also enhances confidence hence the associated confidence score is higher. If the peripheral entity and the target entity have a familial relationship, the confidence score is higher. If the peripheral entity and the target entity are determined to have a relationship that spans at least one, two, or three years, then the confidence score is higher.

Certain data sources can be indicated as more reliable data sources for obtaining certain types of information. For example, a social media page can be determined to be more reliable for obtaining a recent phone number of the target entity. Thus, when the one or more attributes includes a telephone number from a social media page, the confidence score associated with the telephone number is higher. In another example, an educational institution's webpage is a more reliable source for determining whether the target entity is (or was) involved with the educational institution. As such, when the one or more attributes includes a name of the educational institution being obtained due to the target entity's name being present on the institution's webpage, then the confidence score is higher.

The confidence score can be calculated in multiple ways. In some implementations, an associative table that ranks sources and fields can be developed for calculating the confidence score associated with an attribute. The associative table can include an associative score for each {source, field} combination. For example, the associative score for {social media website, phone number} can be listed as 5/5 while the associative score for {social media website, name} can be listed as 3/5. Associative pairs that are not listed in the associative table or that do not have an associative score can be given a default score. For example, if a pair {social media website, work} does not have an associative score, a score of 2/5 can be provided as a default.

In some implementations, multiple sources can return the same attribute for a specific field. The agreement between the multiple sources can increase confidence in the attribute. In some implementations, the associative scores for the different pairs are added to determine the confidence score. For example, if a social media website and an educational institution both return the same attribute for a school field, then the associative score for {social media website, school} and {educational institution, school} are added together to obtain the confidence score for the attribute. In some implementations, the maximum associative score for the different pairs is used as the confidence score for the attribute. That is, in the previous example, if {social media website, school} has a higher associative score than {educational institution, school}, then the confidence score for the attribute is determined to be the associative score for {social media website, school}. The type or categories for sources can be more granular. For example, within social media websites, a professional social media website can be distinguished from a private social media website and can have a higher associative score for a specific field when compared to the private social media website.

The confidence score is continuously calculated and adjusted and thus can be updated automatically as new information about the target of interest is discovered during the profiling process and as new data stores are probed for information about the target's profile. Each item of information in the profile can have a different confidence score, and if the confidence score does not exceed a threshold, e.g., 50% or better, then the item will not be added to the target's profile. This prevents unreliable information from being populated into the profile, even if information is found about the attribute under consideration. Reliability can be enhanced if a person having a familial or friendship relationship with the target publishes or posts information about the target entity.

In an example, during a phone number seed search, an email address was received from data source A. In some implementations, a data source can have an inherent certainty score associated with it and not just the associative score based on data obtained from the data source. In this example, data source A has an inherent certainty score of 0.4. The certainty score attached to data source A is low because data source A is a third party repository API that does not provide visibility to where data stored in data source A was obtained. As such, in this example, any data obtained from data source A has an associative score of 0.4. If the threshold for comparing confidence scores is set to 0.5, then data obtained from the data source A (i.e., the received email address) should not be added to the target's profile or be presented to a user for verification. However, within the same discovery process a data source B returned the same email address. The data source B is a social media post, so the data source B has a high inherent certainty score of 0.85. In this example, the inherent certainty score of the data source B is high because the social media post is of reasonable length, and the email address and the phone number seed are in approximately in the same vicinity within the text of the social media post. Since the email address is found in both data source A and data source B, the confidence score associated with the email address can be determined to be 0.85 plus a percentage boost (e.g., a ten percent boost), since the email address has been cross checked with another source (data source A). That is, the confidence score associated with the email address can be 0.85 plus 10% boost for a total of 0.935. That is, the larger of the two scores between 0.4 and 0.85 is used as the confidence score for the email address, and since the email address has been found in two different sources, this confidence score is boosted to indicate a higher level of trust. In some implementations, the amount of the boost (e.g., a four percent boost, a ten percent boost, a twenty percent boost, etc.) is in relation to the confidence score associated with the cross-check data source. In this example, the data source A is the cross-check data source.

At step 508, the at least one unpopulated field in the summary profile associated with the target entity is populated with the one or more attributes obtained at step 504 based at least in part on the determined confidence scores of step 506. A confidence threshold can be set where attributes that have a confidence score that exceeds the threshold are stored in the summary profile. In some implementations, the attributes that do not have a confidence score that exceeds the threshold are discarded. In the previous example, the determined confidence score of 0.935 is above the 0.5 threshold, so the email address is determined to be reliable and can be used to populate an unpopulated field. This process 500 to identify missing, protected, incomplete, or inaccurate information based on social media criteria and connections with other individuals in a target's sphere of associations improves the discovery engine by augmenting and supplementing information in the target's profile where the discovery engine and the probes are unable to extract this information from the probed data sources. This represents an improvement in the technology of computer-implemented searches by augmenting missing or hidden data that cannot be retrieved using the probes and also leverages information posted or published by other users having a meaningful relationship with the target entity (e.g., familial, friendship, commercial) and other indicators of reliability (e.g., frequency of communication or social media engagement between target entity and other user) to increase reliability and confidence in the authenticity and accuracy of the information. Because the initial seed attribute is a person or organization, the process 500 is tailored to locate additional attributes about the person or organization by analyzing ascertainable factors about the target to compute a confidence score before adding the missing attribute to the target's profile.

Figure 6:
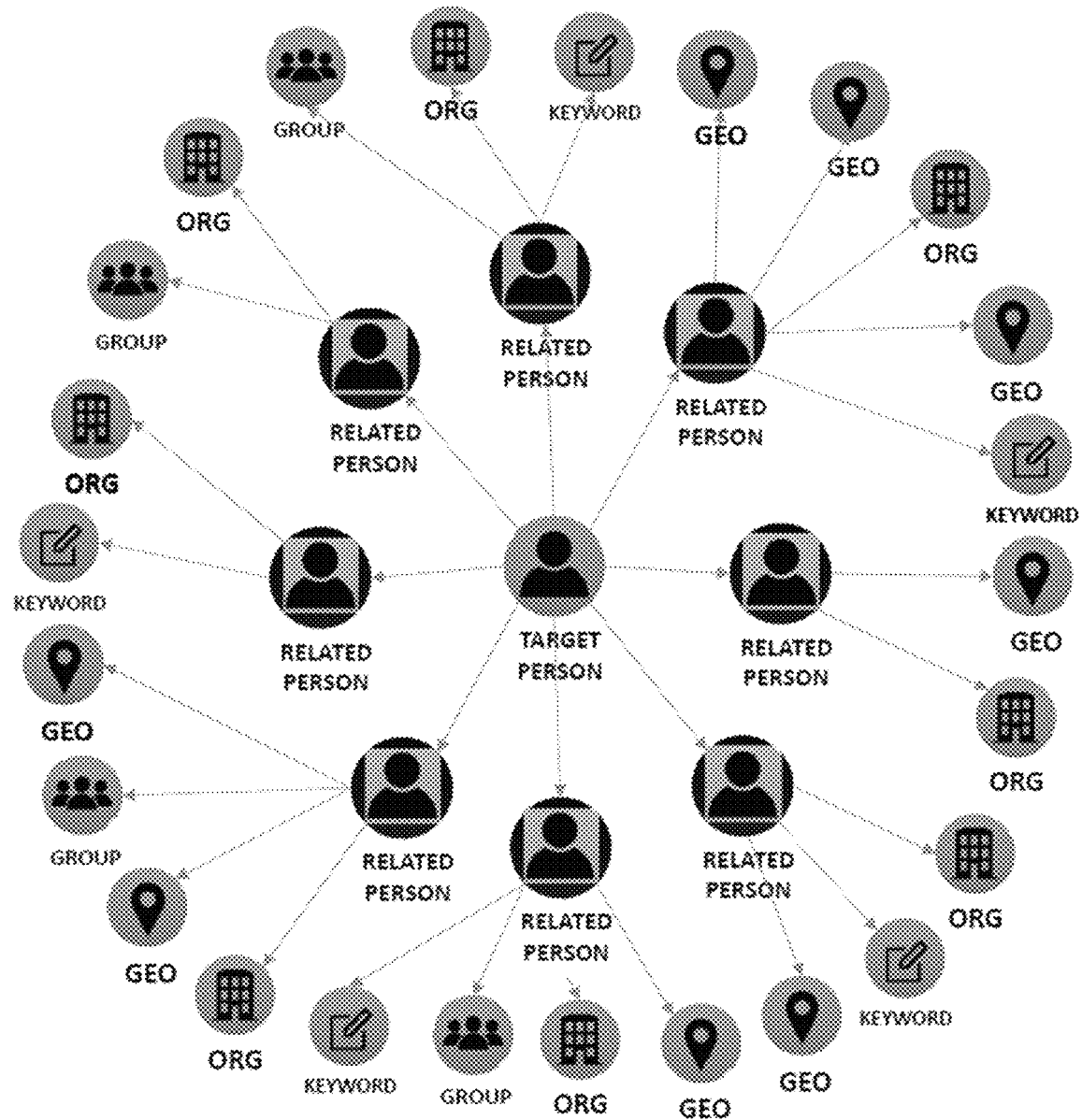
FIG. 6 illustrates an example relational diagram, according to some implementations of the present disclosure.

FIG. 6 illustrates an example relational diagram that can be generated based on a sphere of influence analysis, according to some implementations of the present disclosure. A target entity (e.g., a target person) can be associated with one or more peripheral entities (e.g., multiple related persons). The target person has no control over data of the related persons. Therefore, information associated with the target person can be obtained from any one of the related persons. In some cases, information that the target person purposely hides or protects can be gleaned from information shared by the multiple related persons. For example, when analyzing information of the multiple related persons, common geographical locations that are shared with two or more of the related persons can be associated with the target person. In some implementations, organization and group affiliation can be gleaned. In some implementations, organizational structure, with title of the target person can be determined based on interactions between at least one of the related persons and the target person.

Figure 7:
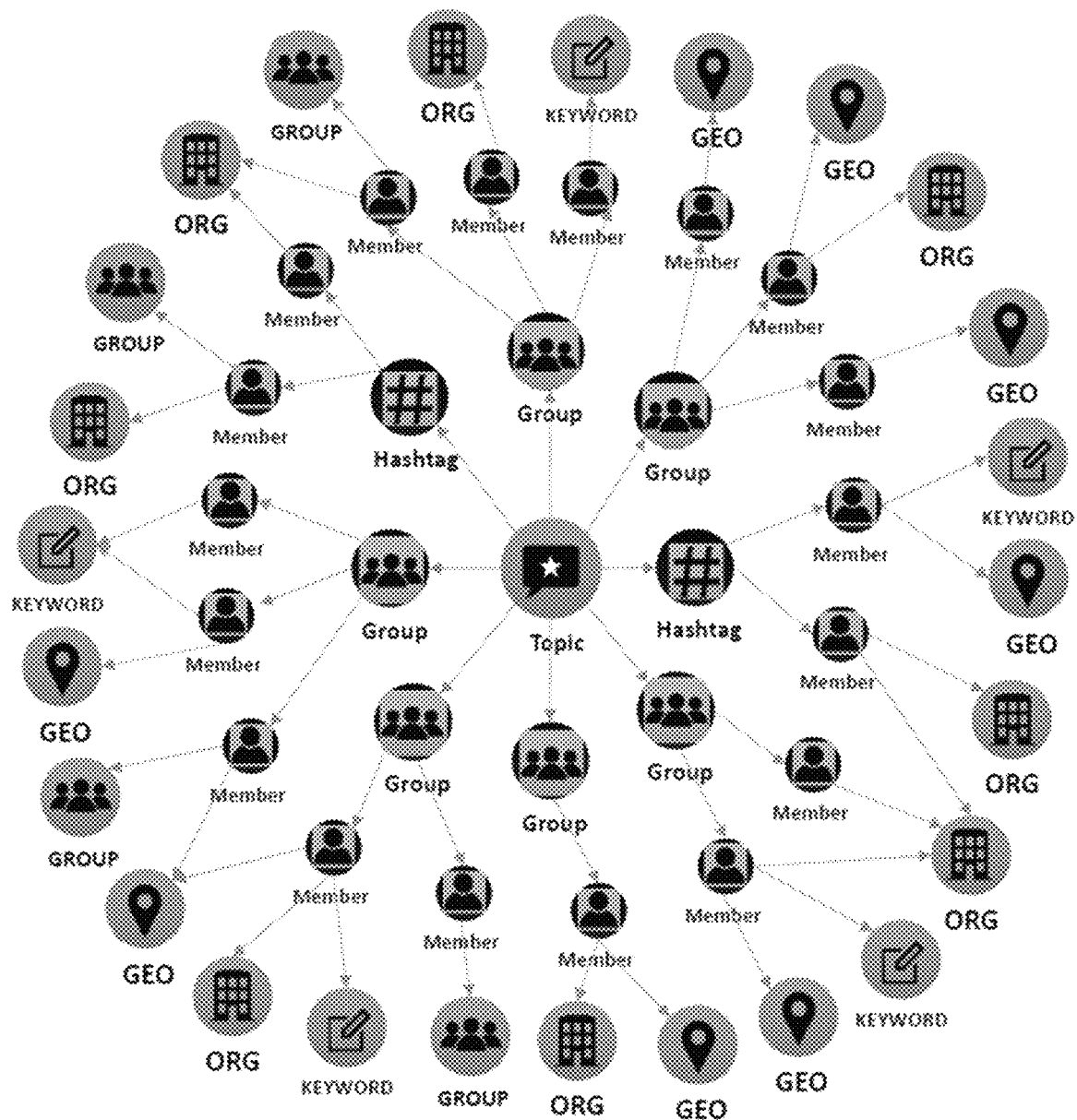
FIG. 7 illustrates another example relational diagram, according to some implementations of the present disclosure.

FIG. 7 illustrates an example relational diagram, according to some implementations of the present disclosure. The relational diagram of FIG. 7 has a "topic" at the center, and the topic can be linked to formal "groups" or informal groups or "hashtags". Members of a social network that are part of the formal groups, that contribute to the informal groups, or that are tagged to receive information from the informal groups can be determined. From there, information from the members can be determined. The relational diagram of FIG. 7 allows finding groups of individuals and/or organizations. The groupings of individuals and/or organizations can help identify peripheral entities associated with a target entity through a common topic that both entities are interested in. Topics of interest can help expose dominant organizations, geographic locations of individuals that mostly care about the topics, and the specific individuals.

The application server 103, the support server 106, and/or the probes network 110 of FIG. 1 can analyze collected data using different techniques. For example, text contents from webpages, blog posts or other online posts, group chats, text messages, instant messages, emails, etc., can be analyzed to extract information that can be considered attributes. For example, natural language processing and named entity recognition can be used to understand and associate entities within obtained text. Different languages can be detected based on vocabulary, grammar, syntax, etc., allowing the system 100 to classify a target entity's topics of interests or fluency in language. Topic recognition can be used as discussed in connection with FIG. 7 to link different members together and to find groups.

In addition to text contents, in some implementations, images can be analyzed to extract information. For example, optical character recognition can be used to make text in images decipherable using natural language processing techniques. Furthermore, object recognition algorithms can be applied to identify objects, recognize faces, recognize landmarks, etc. This can allow the system 100 to populate geographic locations associated with the target entity, individuals associated with the target entity, etc. Analysis results can provide topics, email addresses, phone numbers, associated or related persons, organizations, geographic locations, usernames, group invitations, social media accounts, discussed webpages, spoken languages, spoken phrases, propaganda phrases, conspiracy theory groups, flags, symbols, background banners, weapons, vehicles, etc. These different attributes can be stored in the summary profile associated with the target. In some implementations, a report can be generated for the member that performed the search on the target entity.

Figure 8:
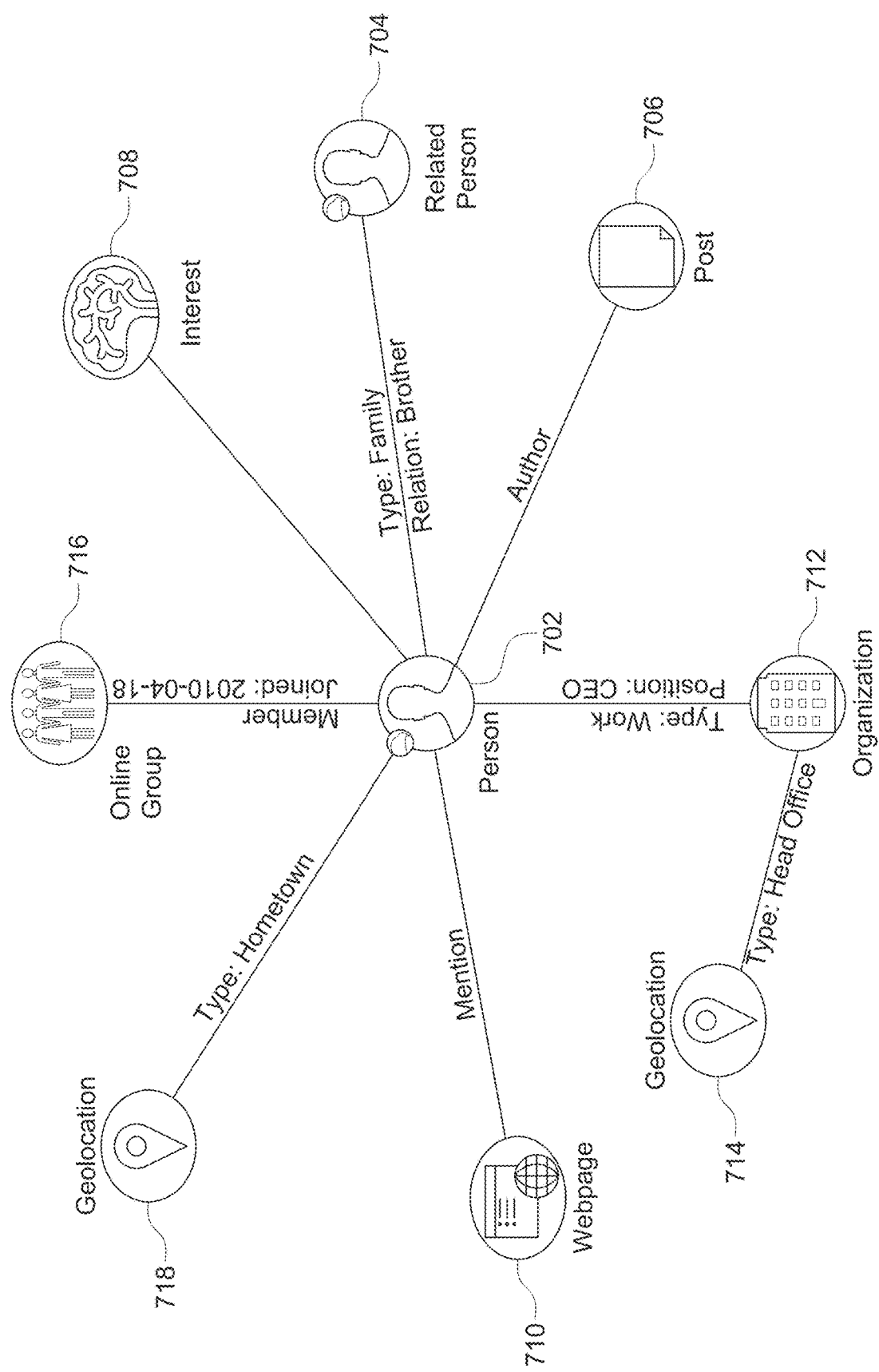
FIG. 8 is a graphical user interface showing relationships between entities, according to some implementations of the present disclosure.

FIG. 8 illustrates an example graphical user interface (GUI) that displays relationships or associations between or among entities, according to some implementations of the present disclosure. A person 702 is shown as the locus in the center of the GUI and is connected to a related person 704. The connection type is shown in this example to be family, and the related person 704 is indicated to be the brother of the person 702. An icon "post" 706 is shown connected to the person 702. The person 702 is indicated as the author of the post 706. Similarly, an interest icon 708 is displayed connected to the person 702. The person 702 is connected to a webpage 710. The connection is deemed to be that the person is mentioned in the webpage 710. The person 702 is connected to organization 712. The edge between the person 702 and the organization 712 indicates that the person works at the organization 712 and is a chief executive officer (CEO) of the organization 712. The organization 712 is connected to geolocation 714. The geolocation 714 is the head office of the organization. The person 702 is connected to geolocation 718, which is indicated to be the hometown of the person 702. The person 702 is connected to an online group 716, and the person 702 is indicated to be a member of the online group 716 since Apr. 18, 2018. This example GUI allows a user to quickly visualize relationships and connections between a target (e.g., 702) and other affiliated persons (e.g., 704) or organizations (e.g., 712) to conduct a full discovery and obtain insights from the visualization of the information portrayed on the GUI. A target's online interconnections aids in visualizing new relationships or dynamics not ascertainable through words or through multiple diagrams. Seeing the relationships and leveraging the computer interface to help visualize how each person or organization is associated with the target produces an improved interface compared to conventional display arrangements. FIG. 8 provides an example where visual connections among associated persons or organizations and icons can indicate whether, e.g., the association is through a mutual person or through a mutual organization. FIG. 8 also provides an optional list of keywords, indicating the nature of the connections between the target and each affiliated person. The combination of the visual connections and the optional list of keywords results in an improved computer interface. These visualizations can inspire additional searches or new and surprising relationships not previously known, and can aid in constructing a profile for a target of interest starting from just a single piece of information. Building a profile of attributes about a target of interest is important, and so too is the ability to visualize associations between the target of interest and other people or organizations, the nature of those associations, and how those associations exist. Preferably, a single GUI is utilized to convey all relationships and associations between a person or target of interest and other information. The lines, thickness of the lines, color, etc. can be used to visually distinguish the type of association and the strength of an association. The length of the line can be used to indicate a time range of the association between the person and the associated information.

Although not shown, other information can also be displayed in the GUI of FIG. 8. For example, the geolocation 714 can be determined using GPS data. In another example, the post 706 can be published on to the online group 716, thus, a line connecting the post 706 and the online group 716 can be made. Notes can also be provided, for example, the relationship between the person 702 and the related person 704 was identified using social media. The GUI of FIG. 8 can be updated over time based on populating missing information. That is, new associations or relationships can be added as new information is obtained. New nodes can be added as well. In some implementations, nodes and/or relationships can be removed. The specific layout portrayed on the GUI will be based on information updated according to some implementations of the present disclosure. In some implementations the GUI of FIG. 8 only includes nodes with information that have a confidence score above a certain threshold. As information is being vetted or more information comes in that reduces the confidence score, if the confidence score falls below the threshold, the affected nodes and/or relationships can be removed. Similarly, as information is being vetted and as the confidence score increases, if the confidence score increases above the threshold, then a new node and/or relationship related to the confidence score can be added.

Embodiments of the present disclosure can be used for investigations. For example, the process 300 can be used on a phone number belonging to a crime suspect, and other information related to the crime suspect can emerge. These can include family members, friends, neighbors, a place of work, a gym that the suspect frequents, a restaurant that the suspect frequents, social media posts, group affiliations, etc. In another example, the process 300 can be used on a phone number associated with an organization, and other information related to the organization can emerge. For example, sister organizations can be identified, members of the organization and sister organizations, topics associated with the organization, etc. Visual tools and GUIs can be used to display investigative information obtained.

The GUI can be updated dynamically as a user interacts with the information presented thereon. For example, if a user clicks on any of the items of information, e.g., 704, a new GUI is displayed with the related person 704 shown as the locus of the information hub, along with lines of association with information associated with that related person 704. This manner of interaction allows the user to quickly follow relationships or associations in a highly visual manner to discover insights about the person 702. By rearranging the associations as the user clicks on an item of information, new insights can be visually exposed to the user in a manner that conventional techniques cannot. While the associations are shown on an electronic video display as a 2-dimensional network of associated items linked by graphical lines, in the computer system, they are represented as multi-dimensional, many-to-many associations among disparate and disassociated types of information that would be impossible for any human mind or human network to keep track of. In some implementations, the number of associations can be on the order of hundreds of thousands, millions, or even billions depending on the profile level of the person of interest 702.

Figure 9:
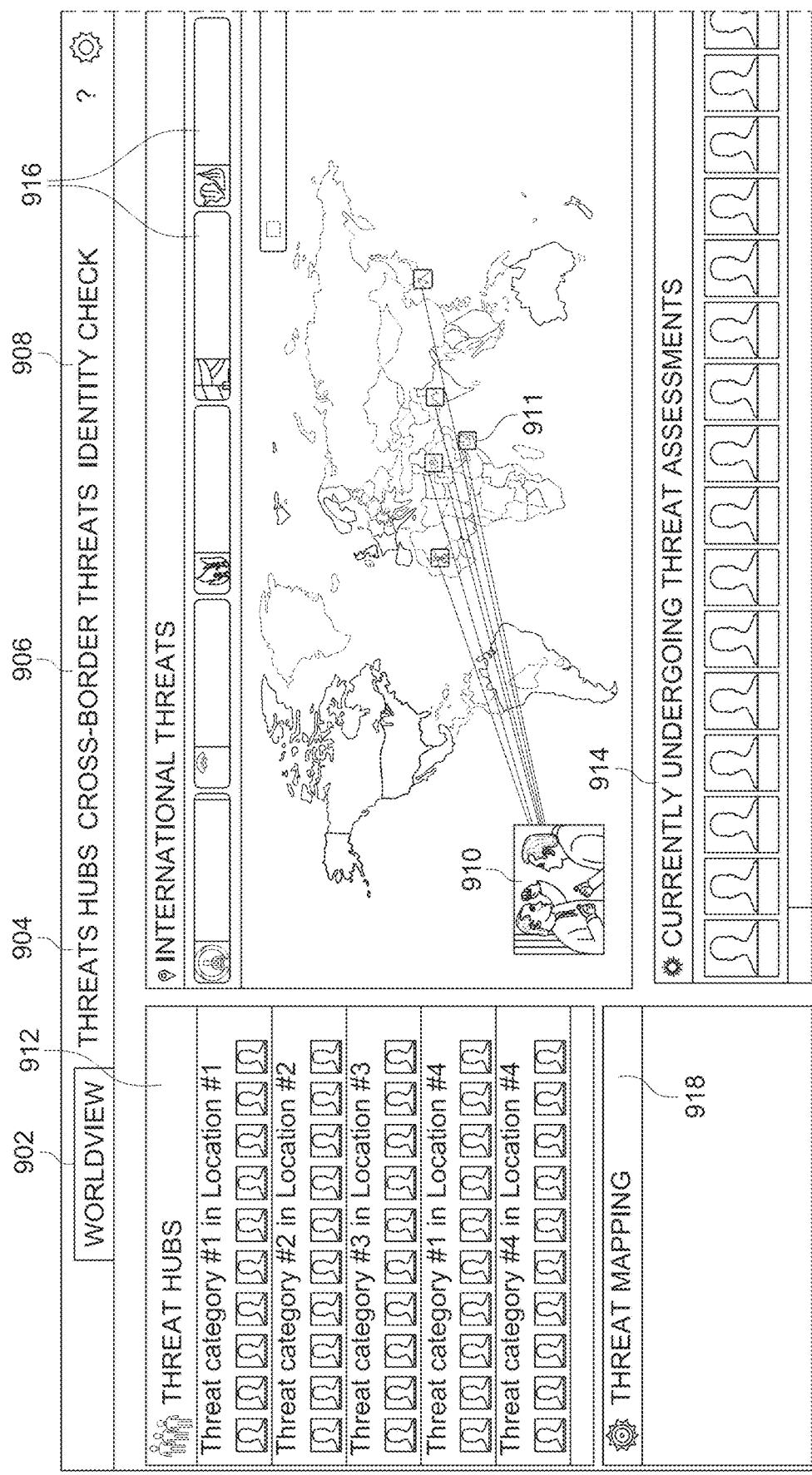
FIG. 9 is a graphical user interface showing information associated with a selected target entity, according to some implementations of the present disclosure.

FIG. 9 illustrates an example GUI for displaying information on a selected or target entity, according to some implementations of the present disclosure. The GUI includes a menu that provides "worldview" 902, "threat hubs" 904, "cross-border threats" 906, and "identity check" 908. "Worldview" 902 is a map view that includes image icons (e.g., 911) displayed on a world map as illustrated in FIG. 9. The image icons are linked to an overall group 910, showing a global distribution of entities (persons and/or organizations) associated with the group 910 across the globe. The "worldview" 902 provides a unique way of attributing specific content to geolocation. The "worldview" 902 can not only show amount of data per geolocation but can display specific image icons (e.g., 911) or image content by location. In an embodiment, the information displayed on the world map of FIG. 9 can be dynamically filtered to show only content relating to specific threats.

The GUI can further include a preview window for one or more of the other options. For example, a "threat hubs" 912 side panel is provided as a preview of the screen that would be displayed if the "threat hubs" 904 option was chosen. The "threat hubs" 912 side panel can provide, for example, threat categories for different locations. In an example, a threat category can threat category #1 is "property crime" and a location #1 is "Chicago". The GUI can further include a list 914 of individuals and/or organizations that are yet to be characterized but have been identified as having some relation to the group 910. For example, the individuals may be two or three degrees separated from a member of the group 910. This individual may not know about the group activities of the member, hence, analysis is performed to rule out the individual. The GUI also includes a set of keywords, icons or banners 916 associated with the group 910. The GUI also includes a panel 918 that can present keywords associated with the group 910. In the example of FIG. 9, no keywords are presently displayed in the panel 918. Example keywords can include civil disobedience, civil resistance, unfounded rumors, property crime, etc.

In some implementations, the displayed set of keywords, icons or banners 916 designate keywords that represent a highest threat score association based on underlying data. For example, the threat score can be calculated for each individual and/or organizational profile in the system 100. The keywords can then be ranked by decreasing order based at least in part on the set of profiles covered by the keywords. For example, the keyword online vigilantism can cover about 200 profiles with a mean threat score of 210, a median threat score of 220, and a threat score mode of 210; the keyword civil disobedience can cover about 100 profiles with a mean threat score of 300, a median threat score of 250, and a threat score mode of 280; the keyword 5G-conspiracy can cover about 50 profiles with a mean threat score of 260, a median threat score of 80, and a threat score mode of 90. The order of the set of keywords can be based on the number of profiles covered (civil disobedience, online vigilantism, 5G-conspiracy), mean threat score (civil disobedience, online vigilantism, 5G-conspiracy), median threat score (5G-conspiracy, civil disobedience, online vigilantism), etc. The GUI of FIG. 9 can be updated and refreshed based on criteria for ranking the keywords, as the number of profiles change over time or as information is updated in the different profiles (e.g., as missing information is populated according to some implementations of the present disclosure). A GUI that adapts, as underlying data from thousands if not millions of databases are probed to gather information about individuals and organizations, can readily present a landscape of accumulated knowledge. This can help reprioritize resources in realtime. The GUI thus provides a dynamic display of information as assessed underlying data changes.

Figure 10:
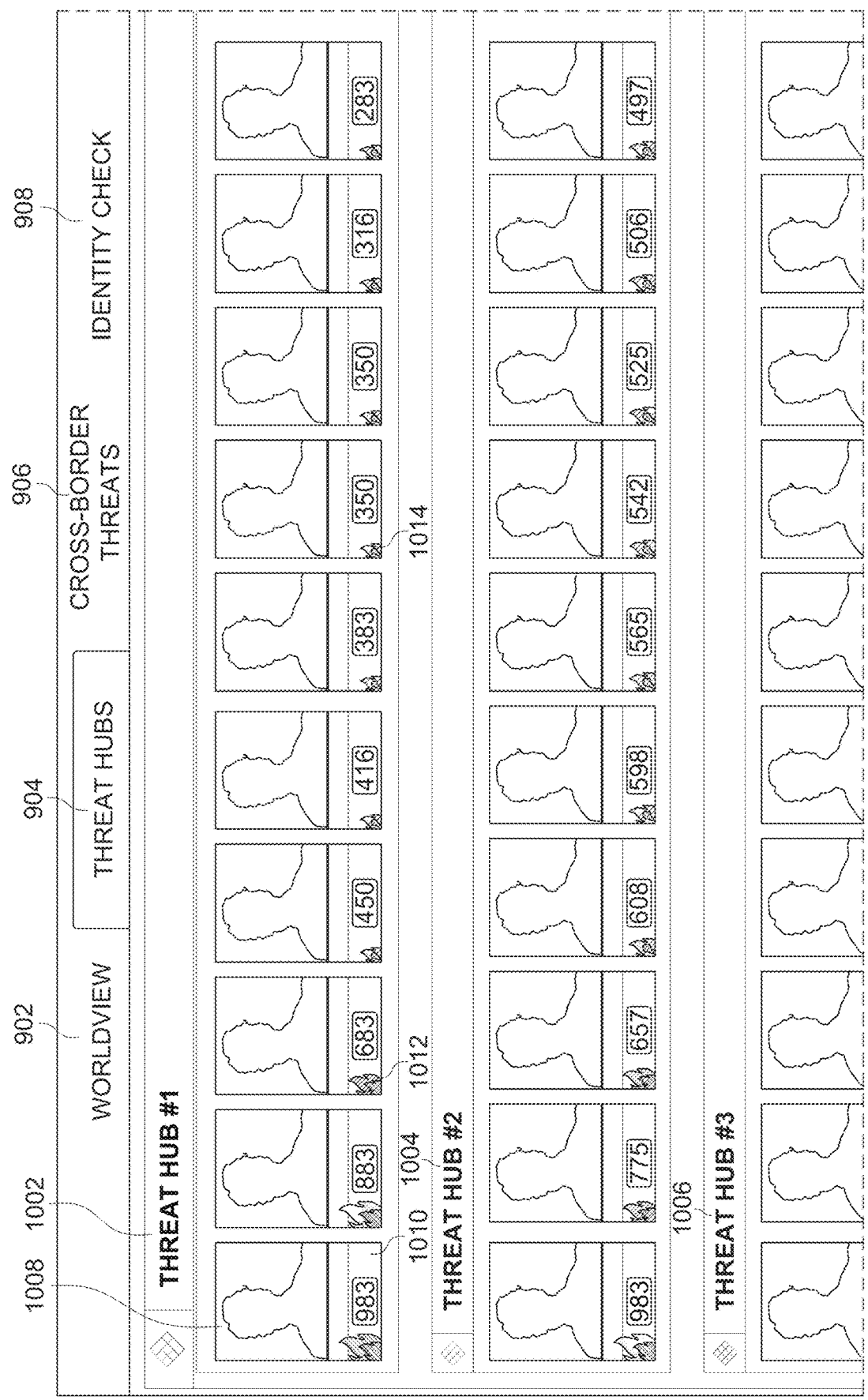
FIG. 10 is a graphical user interface showing a regional view, according to some implementations of the present disclosure.
Figure 11:
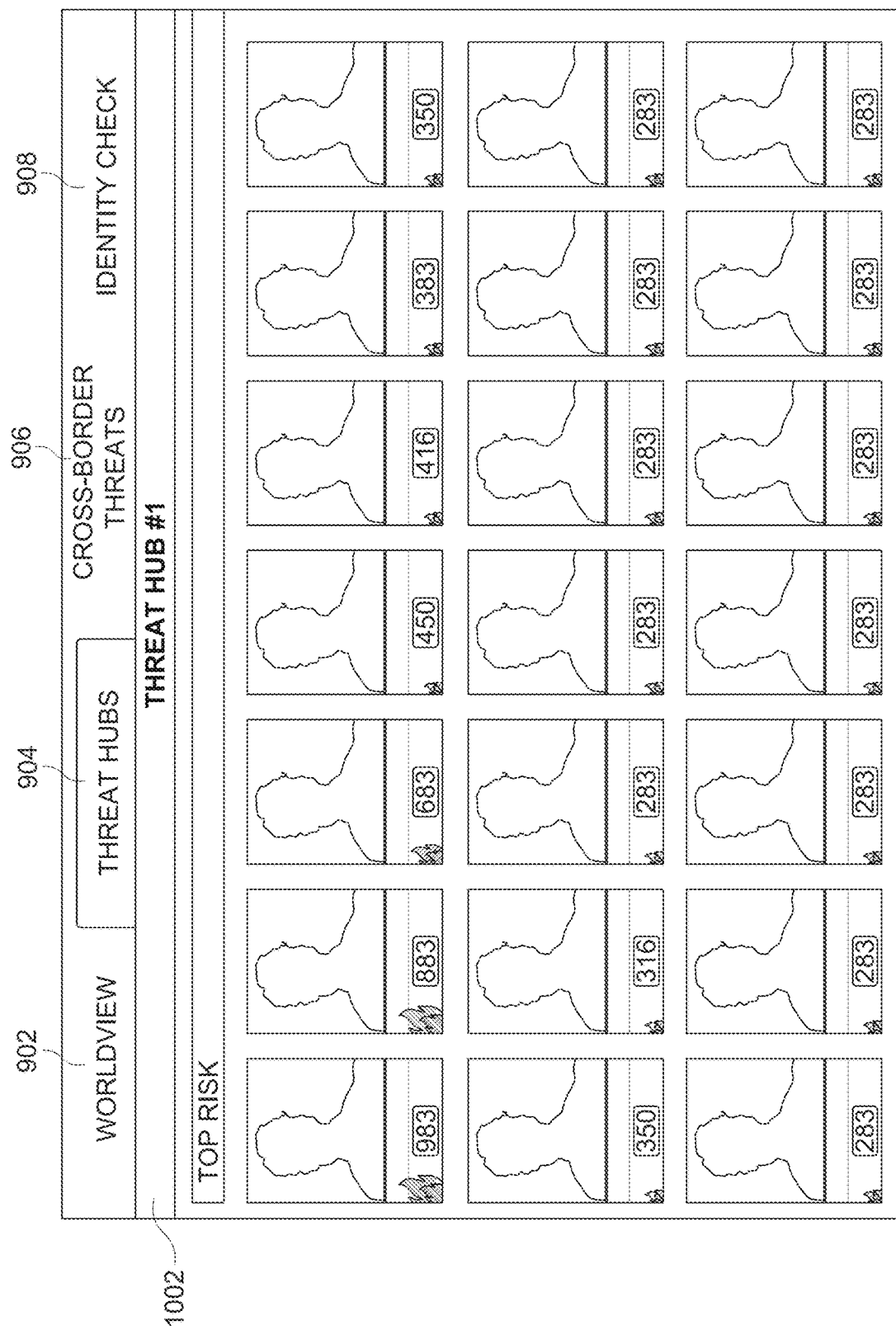
FIG. 11 is a graphical user interface showing a view of a specific region, according to some implementations of the present disclosure.

FIG. 10 illustrates a view when "threat hubs" 904 is selected. Threat hubs provides a regional view where regions 1002, 1004, 1006 are separated. Images (e.g., image 1008) identifying individuals and/or organizations are provided under each of the regions 1002, 1004, and 1006. A confidence score or a rating (e.g., rating 1010) can be displayed under the images to highlight importance of the individual and/or organization. For example, referring to FIG. 1, if the client device 102 is looking for dangerous individuals, then the GUI provided will give ratings for each identified individual on how dangerous each person is. A visual indicator (e.g., indicator 1012 and 1014) can be provided for visually gauging importance of the individual. The visual indicator is correlated with the rating provided for the individual. For example, the visual indicator 1012 corresponds to a rating of 683 and the visual indicator 1014 corresponds to a rating of 350. The visual indicator 1012 has a larger size on the screen when compared to the visual indicator 1014 since 683 is greater than 350. FIG. 11 illustrates a view when the region 1002 is selected. The other regions (e.g., the regions 1004 and 1006) are removed from view and the region 1002 is expanded.

The confidence score or rating (e.g., the rating 1010) can be updated over time and in real-time based on information populated about identified individuals and/or organizations. For example, an individual's posts, comments, likes, and shares on social media can be assigned risk scores taking context into account. For example, posting something to an extremist group generates a higher risk score than posting something to a non-profit charitable organization that has no extremist affiliation. These risk scores are combined to determine the confidence score or rating associated with the individual or organization. The order of images provided in the GUI of the "threat hubs" is based on the rating associated with the individual. As the rating is updated by the system 100, the GUI display changes over time. Referring back to FIG. 10, each of the "threat hubs" sections (e.g., the region 1002 indicating "threat hub #1") can use different criteria for determining the confidence score or rating for the different displayed individuals. For example, "threat hub #1" can attribute risk scores to a set of activities using a first criteria, and "threat hub #2" can attribute risk scores to the set of activities using a second criteria. The first criteria can include generating a high risk score for posting something to an extremist group but the second criteria can include generating a low risk score for the same activity. In some implementations, the same individual may appear in both "threat hub #1" and "threat hub #2" but have a different confidence score or rating association. As such, the GUI displays the individual relative to other individuals in the same category. As underlying data for determining the confidence scores or ratings changes, according to some embodiments of the present disclosure, the individual's position as displayed on the GUI can change over time. Similarly, the displayed rating and visual indicator associated with the individual can change over time as well.

Figure 12:
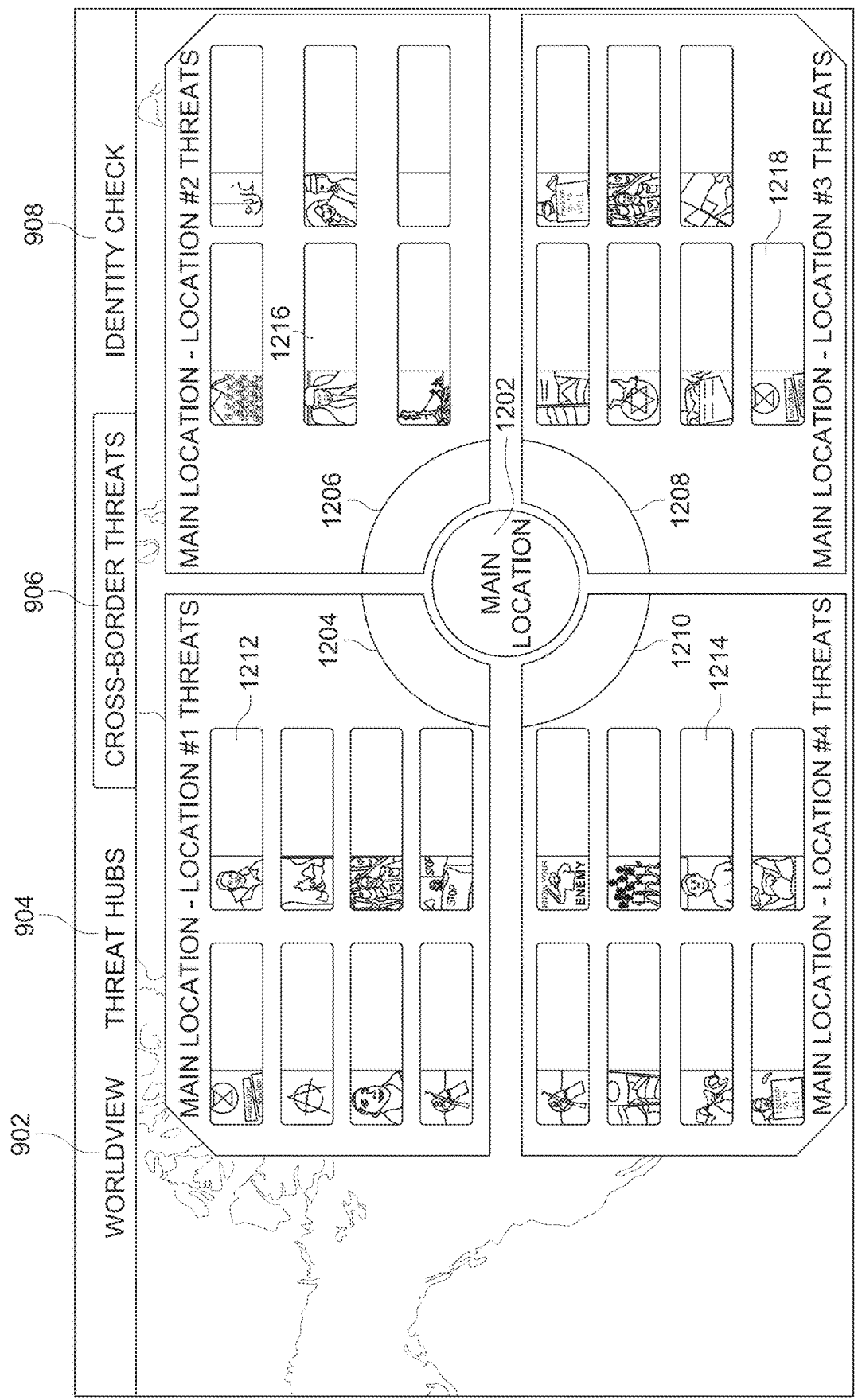
FIG. 12 is a graphical user interface showing a regional interaction view, according to some implementations of the present disclosure.

FIG. 12 illustrates a view when "cross-border threats" 906 is selected. The region 1202 is the region of interest and indicated as "main location", and neighboring and/or influential regions 1204, 1206, 1208, and 1210 are provided. The region 1204 is location #1, the region 1206 is location #2, the region 1208 is location #3, and the region 1210 is location #4. Specific influences of concern for each of the regions 1204, 1206, 1208, and 1210 are displayed in icons or banners (e.g., visual indicators 1212, 1214, 1216, 1218). Although not shown, text or labels can be associated with each of the visual indicators. There can be commonalities between the specific influences. For example, the influence indicated with the visual indicator 1212 can be the same as that indicated with the visual indicator 1214. In some implementations, the threat hubs GUIs of FIGS. 10 and 11 and locations in the GUI of FIG. 12 are dynamically generated by meshing up four dimensions: geolocations, topics, people and text to present either a group of people (in each threat hub) or a list of threats (in each location).

Figure 13:
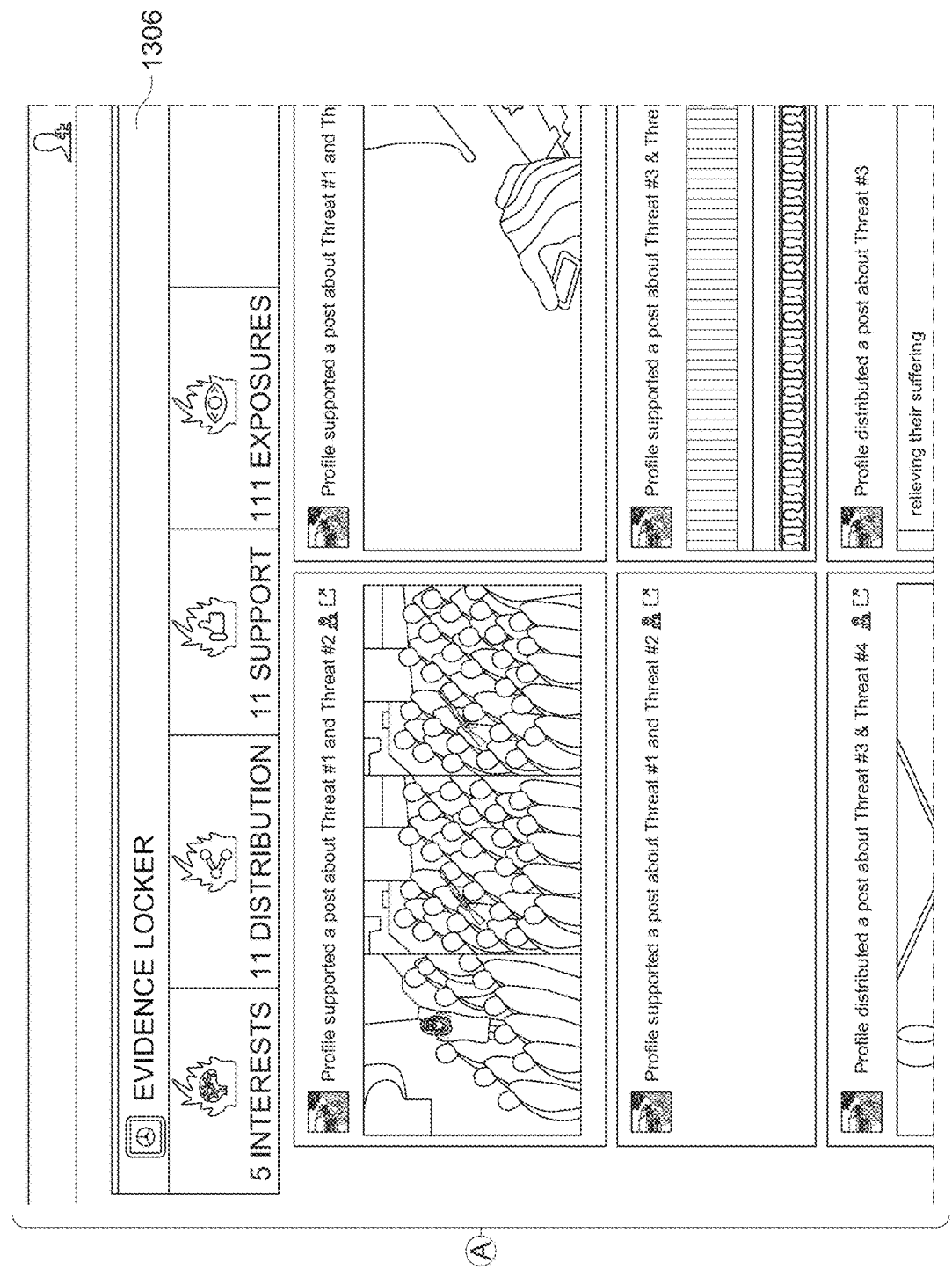
FIG. 13 is a graphical user interface showing a target entity view, according to some implementations of the present disclosure.

FIG. 13 illustrates a target entity view which can be obtained from choosing a specific individual from the "threat hubs" 904 view of FIG. 10 or 11. The target entity view can include an image 1304 associated with the target entity and a name 1308 associated with the target entity. A nationality or location indication (e.g., a flag) can be provided in some implementations. Operations 1310 that can be performed in the target entity view are provided, and these include rerun, merge, report generator, export, delete, etc. In some implementations, the rerun operation involves updating or finding additional attributes associated with the target entity. Merge operation can include joining two or more target entity profiles into one. Report generator operation can include generating a text document that summarizes information obtained on the target entity. Export can involve saving the target entity's profile in another format, and import can involve reading in information from another format to the target entity's profile. Delete can involve deleting the target entity's profile. Topics 1302 associated with the individual can be identified, with a quick summary 1312 provided. Specific information 1306 or authored content associated with the target entity can be displayed in a case the user of the client device 102 wants to verify whether the assessment of the topics 1302 or the summary 1312 is accurate. The summary 1312 includes dynamically generated conclusions based on the profile indicative signature section and the specific information 1306 (i.e., the evidence locker section). The GUI includes text that changes based on information collected and analyzed over time.

The progression from FIGS. 9, 10, 12, and 13 can be described as progression from the world view to the regional view to regional interactions view to the target entity view. The world view includes image icons displayed on a world map, the regional view includes image profiles displayed by region, the regional interactions include image icons representing commonalities and differences between two or more different regions, and the target entity view includes an image of the selected entity with additional information collected about the individual based on searches performed according to some implementations of the present disclosure.

The GUIs in FIGS. 9, 10, 11, 12, and 13 include dynamic components such that display of information in at least part of the GUIs is dependent on information analysis by the system 100. The information collected and analyzed previously resided in disparate locations across different databases on the Internet. As missing information or new profiles are added, the information displayed in the GUIs is updated. In some implementations, groupings are reorganized based on calculated ratings as discussed in connection with FIG. 10.

Embodiments of the present disclosure provide a search or discovery engine for non-indexed, non-linear dynamic discovery expansion starting from a single initial seed attribute of a target of interest. The initial seed attribute can be an email, phone number, name of person, name of group of persons, etc. The single initial seed attribute is used as a search term or parameter to determine associations with the seed attribute from multiple data sources having disparate data types and different access procedures to retrieve data. A profile which includes the seed attribute and associations of the seed attribute discovered through probing the data sources is created. Based on the initial seed attribute, a set of data sources are selected to be probed. Each such selected data source is probed in parallel using one or more probe types. The different probe types can include an API, a browser agent, or a custom firmware, and can extract or retrieve one or more attributes associated with the initial seed attribute. The retrieved one or more attributes are used as the next seed for the next set of data sources to be probed using the same logic and strategy applied by the initial seed attribute. Providing the initial seed attribute automatically creates a profile for storing information about the target entity and any retrieved or extracted attributes associated with the target entity.

Embodiments of the present disclosure provide a method of reliably profiling a target entity's sphere of associations to identify missing, protected, incomplete, or inaccurate information by calculating a score to determine a confidence in a potential association based on a plurality of factors. The factors can include how long the target entity has maintained a connection to an extracted entity, and a type of relationship between the target entity and another potential entity in the target entity's sphere of associations. Associations having a score exceeding a threshold can be added to the target entity's profile as being within the target entity's sphere of associations.

Embodiments of the present disclosure provide a graphical user interface that displays an image of a target entity and an image of an affiliated entity with whom the target entity has an association through online connections. The graphical user interface includes one or more icons indicating whether the association is through a mutual entity, web page, social group, email address, etc., and a list of keywords indicating a nature of the connections between the target and the affiliated person, all on the same interface. The graphical user interface provides a technical improvement by allowing a user to more quickly visualize relationships and connections between a target entity and other affiliated entities. The graphical user interface allows a user to conduct a full discovery and obtain insights from the visualization of the information visually portrayed.

Embodiments of the present disclosure provide a graphical user interface that displays a dashboard including a world map, an image of a target entity, and selectable icons on a country where an association with another entity and the target exists. The graphical user interface allows a user to more quickly visualize relationships and connections between a target and other affiliated entities to conduct a full discovery and obtain insights from the visualization of the information visually portrayed.

The graphical user interfaces disclosed herein are based on collecting, analyzing and scoring a huge amount of data from profiles and posts of targets. An example of a score that is calculated is a threat score of each profile. In each hub of threats, the members are sorted by a risk score, which is the result of a relative scoring algorithm. Each profile's actions (posts, comments, likes, shares) is rated, and the algorithm also takes context into account (e.g., posting something in an extremist group will get the profile more "danger points" than posting it in a group which has a lesser "extremist score"). Scores are constantly recalculated (because new data is constantly coming in) and normalized so it can mean something to a human (i.e. make it a 0-100 scale rather than something not human friendly, such as a 87.15-96.78 scale). Also, a profile has different scores in different threat hubs. For example, the actions of a certain profile may earn that target a high danger score in a threat hub focused on terrorism threats, but a low danger score in a threat hub focused on threats from hooligans.

While the present disclosure has been described with reference to one or more particular implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. A system for displaying information on a selected entity, the system comprising a processor and a non-transitory computer readable medium storing instructions such that when the instructions are executed by the processor, the system is configured to:
   display, on a graphical user interface (GUI), a menu including an option for probing a world view, a regional view, regional interactions, and a target entity view, wherein the world view includes image icons displayed on a world map, the regional view includes image profiles displayed by region, the regional interactions include image icons representing commonalities between two or more different regions, and the target entity view includes an image of the selected entity;
   display, on the GUI, the world view based on the option being the probing of the world view;
   display, on the GUI, a set of keywords associated with the image icons based at least in part on calculated ratings associated with the set of keywords, the set of keywords displayed adjacent to the world map and arranged as a legend along an edge of the world map, wherein an order of the displayed set of keywords is determined based on the associated ratings; and
   display, on the GUI, a group icon visually linked to at least one of the image icons, the image icons overlaid on specific geographic locations on the world map associated with the image icons, the group icon overlaid at a corner position of the world map.

2. The system of claim 1, further configured to display, on the GUI, the regional view based on the option being the probing of the regional view.

3. The system of claim 2, wherein at least two regions are visible in the regional view such that selecting one of the at least two regions expands the selected one of the regions and hides the unselected regions.

4. The system of claim 1, wherein a rating is included in each of the displayed image profiles in the regional view.

5. The system of claim 4, wherein a respective one of the displayed image profiles is positioned on the GUI based at least in part on a respective rating associated with the respective one of the displayed image profiles.

6. The system of claim 4, wherein a visual indicator is included in each of the displayed image profiles in the regional view, wherein a size of the visual indicator is correlated with the rating.

7. The system of claim 1, further configured to receive an input indicating a change of the respective rating associated with the respective one of the displayed image profiles, and in response, re-position the respective one of the displayed image profiles from a first position on the GUI to a second position on the GUI.

8. The system of claim 1, wherein a number of the image icons displayed on the world map is greater than a number of keywords displayed in the set of keywords.

9. The system of claim 1, wherein the group icon is larger than each of the image icons.

10. The system of claim 1, wherein the world view further includes a first side panel adjacent to the world map, the side panel providing a preview of the regional view.

11. The system of claim 10, wherein the world view further includes a second side panel adjacent to the first side panel, the second side panel providing a listing of the set of keywords.

12. The system of claim 11, wherein the world view further includes a third side panel adjacent to the second side panel and adjacent to the world map, the third side panel including a set of entities requiring further analyses for determining a specific relation to the group icon.

13. The system of claim 1, wherein the order of the displayed keywords is further based on a number of the image profiles.

14. The system of claim 1, further configured to display, on the GUI, the regional interactions based on the option being the probing of the regional interactions, the two or more different regions including a first region indicated as a first visual indicator with a first shape and a second region indicated as a second visual indicator with a second shape that is different from the first shape.

15. The system of claim 14, wherein the two or more different regions further include a third region indicated as a third visual indicator and a fourth region indicated as a fourth visual indicator, a fifth region indicated as a fifth visual indicator, wherein the second visual indicator, the third visual indicator, the fourth visual indicator, and the fifth visual indicator all have the same shape.

16. The system of claim 15, wherein the first shape is a circle and the second shape is an arc.

17. The system of claim 16, wherein the second visual indicator, the third visual indicator, the fourth visual indicator, and the fifth visual indicator are arranged around the first visual indicator to encircle the first visual indicator.

18. The system of claim 17, wherein the image icons representing commonalities between the two or more different regions includes a first set of image icons pertaining to the second region, a second set of image icons pertaining to the third region, a third set of image icons pertaining to the fourth region, and a fourth set of image icons pertaining to the fifth region, wherein each of the first, second, third, and fourth set of image icons is grouped and displayed at different locations on the GUI.

19. The system of claim 1, further configured to display, on the GUI, the target entity view based on the option being the probing of the target entity view, the target entity view including visual indicators of operations including a rerun operation for updating the target entity view with additional attributes associated with the selected entity.

\* \* \* \* \*